(12) United States Patent
Kim et al.

(10) Patent No.: US 7,705,926 B2
(45) Date of Patent: Apr. 27, 2010

(54) LIQUID CRYSTAL DISPLAY

(75) Inventors: Dong-Gyu Kim, Yongin-si (KR);
Back-Won Lee, Cheonan-si (KR);
Seung-Soo Baek, Seoul (KR)

(73) Assignee: Samsung Electronics Co., Ltd.,
Suwon-Si (KR)

( * ) Notice: Subject to any disclaimer, the term of this patent is extended or adjusted under 35 U.S.C. 154(b) by 360 days.

(21) Appl. No.: 11/565,837

(22) Filed: Dec. 1, 2006

(65) Prior Publication Data
US 2007/0126944 A1 Jun. 7, 2007

(30) Foreign Application Priority Data
Dec. 2, 2005 (KR) .................. 10-2005-0116790

(51) Int. Cl.
*G02F 1/133* (2006.01)
*G02F 1/1337* (2006.01)

(52) U.S. Cl. .................. 349/43; 349/129; 349/143

(58) Field of Classification Search .................. None
See application file for complete search history.

(56) References Cited

U.S. PATENT DOCUMENTS

| 7,133,098 | B2 * | 11/2006 | Lin .................. 349/129 |
| 7,295,275 | B2 * | 11/2007 | Ko .................. 349/141 |
| 2002/0057411 | A1 * | 5/2002 | Kim et al. .................. 349/141 |
| 2002/0093615 | A1 * | 7/2002 | Mun et al. .................. 349/143 |
| 2004/0233343 | A1 * | 11/2004 | Baek .................. 349/38 |
| 2004/0233378 | A1 * | 11/2004 | Okamoto et al. .................. 349/156 |
| 2005/0134779 | A1 * | 6/2005 | Park et al. .................. 349/139 |

* cited by examiner

*Primary Examiner*—Tina M Wong
(74) *Attorney, Agent, or Firm*—F. Chau & Associates, LLC

(57) ABSTRACT

A liquid crystal display includes a substrate, a plurality of pixel electrodes formed on the substrate wherein each of the pixel electrodes includes first and second sub-pixel electrodes, and a plurality of first data lines formed on the substrate, wherein a first data line of the plurality of first data lines does not overlap a first sub-pixel electrode and partially overlaps a second sub-pixel electrode of a pixel electrode of the plurality of pixel electrodes.

54 Claims, 26 Drawing Sheets

LIQUID CRYSTAL DISPLAY

CROSS-REFERENCE TO RELATED APPLICATION

This application claims priority to Korean Patent Application No. 10-2005-0116790 filed in the Korean Intellectual Property Office on Dec. 2, 2005, the disclosure of which is incorporated by reference herein in its entirety.

BACKGROUND OF THE INVENTION

1. Technical Field

The present invention relates to a liquid crystal display.

2. Discussion of the Related Art

Liquid crystal displays (LCDs) are among the most widely used flat panel displays. For example, liquid crystal displays are commonly found in a variety of electronic devices such as televisions, laptop computers, personal digital assistants, cell phones and digital cameras.

An LCD includes a pair of panels provided with field-generating electrodes such as pixel electrodes and a common electrode and a liquid crystal (LC) layer interposed between the panels. The LCD displays images by applying voltages to the electrodes to generate an electric field in the LC layer, and regulates the strength of the electric field to vary the transmittance of light passing through the LC layer.

An LCD also includes switching elements connected to respective pixel electrodes and a plurality of signal lines such as gate lines and data lines for controlling the switching elements and applying voltages to the pixel electrodes.

In such an LCD, to prevent the LC layer from deteriorating due to a one-directional electric field applied for a long time, the polarity of a data voltage is reversed for each frame, for each row, or for each pixel with respect to a common voltage.

Meanwhile, a parasitic capacitance is generated between a data line and a pixel electrode of the LCD. The parasitic capacitance affects the pixel electrode voltage by changing the voltage of a sub-pixel electrode applied with a high voltage, thereby changing the luminance of the sub-pixel electrode. Consequently, vertical cross-talk is generated, which deteriorates the image quality of the LCD. Such vertical cross-talk can be particularly pronounced when a column inversion driving is performed.

Accordingly, there is a need for an LCD that has a minimized occurrence of vertical cross-talk as well as a sufficient aperture ratio.

SUMMARY OF THE INVENTION

An exemplary embodiment of the present invention provides a liquid crystal display including a substrate, a plurality of pixel electrodes formed on the substrate wherein each of the pixel electrodes includes a first and a second sub-pixel electrode, and a plurality of first data lines formed on the substrate, wherein a first data line of the plurality of first data lines does not overlap a first sub-pixel electrode and partially overlaps a second sub-pixel electrode of a pixel electrode of the plurality of pixel electrodes.

The first data line may include a first portion not overlapping the first sub-pixel electrode and a second portion partially overlapping the second sub-pixel electrode, and the first and second portions may be curved to each other.

The second portion of the first data line may include a third portion overlapping the second sub-pixel electrode and a fourth portion not overlapping the second sub-pixel electrode.

The third and the fourth portions of the first data line may be curved to each other.

The first data line may be connected to the first sub-pixel electrode.

The liquid crystal display may further include a second data line that is adjacent to the first data line.

The second data line may be disposed apart from the pixel electrode.

The second data line may not overlap the pixel electrode.

The second data line may include a first portion adjacent to the first sub-pixel electrode and a second portion adjacent to the second sub-pixel electrode.

A part of the second portion of the second data line may overlap the second sub-pixel electrode.

The second data line may be connected to the pixel electrode.

The second data line may include a first portion adjacent to the first sub-pixel electrode and a second portion adjacent to the second sub-pixel electrode, and a part of the second portion may overlap the second sub-pixel electrode.

The second data line may not overlap the pixel electrode.

Each of the first and second sub-pixel electrodes may include at least one parallelogrammic electrode piece, each parallelogrammic electrode piece having lengthwise edges and oblique edges that are adjacent to the lengthwise edges.

At least one lengthwise edge of the parallelogrammic electrode pieces of the first and second sub-pixel electrodes may adjoin each other.

At least one oblique edge of each of the parallelogrammic electrode pieces of the first and second sub-pixel electrodes may meet each other at right angles.

The liquid crystal display may further include a tilt direction determining member formed at the first and second sub-pixel electrodes.

The tilt direction determining member may include a plurality of cutouts that have oblique edges which are substantially parallel to the oblique edges of the parallelogrammic electrode pieces.

Each of the first and the second sub-pixel electrodes may include a first and a second edge that are substantially parallel to the first data line, and a third and a fourth edge that are perpendicular to the first and second edges.

A height of the first sub-pixel electrode may be different from a height of the second sub-pixel electrode.

The first sub-pixel electrode and the second sub-pixel electrode may be adjacent to each other.

A transverse center-line of the first sub-pixel electrode and a transverse center-line of the second sub-pixel electrode may be aligned with each other.

A voltage of the first sub-pixel electrode and a voltage of the second sub-pixel electrode may be different from each other.

An area of the first sub-pixel electrode may be smaller than an area of the second sub-pixel electrode, and a voltage of the first sub-pixel electrode may be higher than a voltage of the second sub-pixel electrode.

The first sub-pixel electrode and the second sub-pixel electrode may be applied with different data voltages, the different data voltages may be obtained from the same image information.

The liquid crystal display may further include a first thin film transistor connected to the first sub-pixel electrode and a second thin film transistor connected to the second sub-pixel electrode, and a gate line connected to the first and second thin film transistors.

The liquid crystal display may further include a first storage electrode line and a second storage electrode line that are parallel to the gate line.

The first thin film transistor may include a first drain electrode overlapping the first storage electrode line and the second thin film transistor may include a second drain electrode overlapping the second storage electrode line.

The liquid crystal display may further include a first thin film transistor connected to the first sub-pixel electrode, a second thin film transistor connected to the second sub-pixel electrode, a first gate line connected to the first thin film transistor, and a second gate line connected to the second thin film transistor.

The first and second thin film transistors may be turned on in response to signals from the first and second gate lines, respectively, and transmit signals from the first data line.

The liquid crystal display may further include a first thin film transistor connected to the first sub-pixel electrode and the first data line, a second thin film transistor connected to the second sub-pixel electrode, a second data line connected to the second thin film transistor, and a gate line connected to the first and second thin film transistors and intersecting the first and second data lines.

The first and second thin film transistors may be turned on in response to signals from the gate line, and transmit signals from the first and second data lines, respectively.

The liquid crystal display may further include a first storage electrode line and a second storage electrode line that are parallel to the gate line.

The first thin film transistor may include a first drain electrode overlapping the first storage electrode line, and the second thin film transistor includes a second drain electrode overlapping the second storage electrode line.

BRIEF DESCRIPTION OF THE DRAWINGS

FIG. 14 is a cross-sectional view of the LC panel assembly illustrated in

FIG. 13 taken along line XIV-XIV;

DETAILED DESCRIPTION OF EXEMPLARY EMBODIMENTS

The present invention will be described more fully hereinafter with reference to the accompanying drawings, in which exemplary embodiments of the invention are shown. The present invention may, however, be embodied in many different forms and should not be construed as limited to the embodiments set forth herein.

It will be understood that when an element such as a layer, film, region, or substrate is referred to as being "on" another element, it can be directly on the other element or intervening elements may also be present.

A liquid crystal display (LCD) according to an exemplary embodiment of the present invention will be described in detail with reference to FIG. 1 and FIG. 2.

Figure 1:
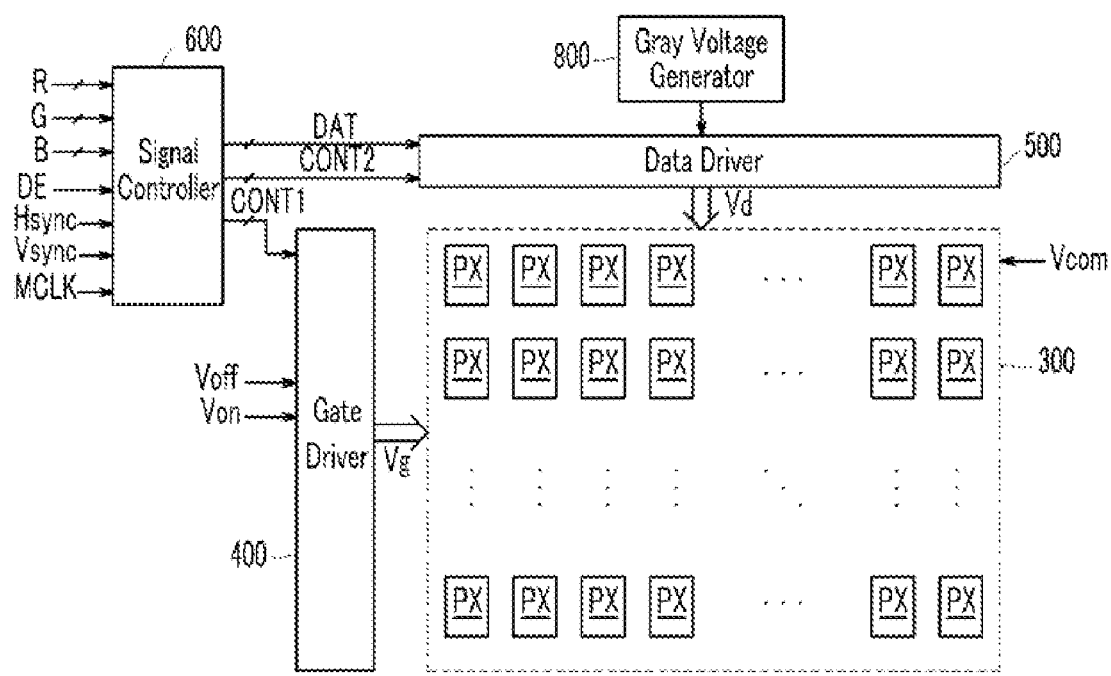
FIG. 1 is a block diagram of a liquid crystal display (LCD) according to an exemplary embodiment of the present invention.
Figure 2:
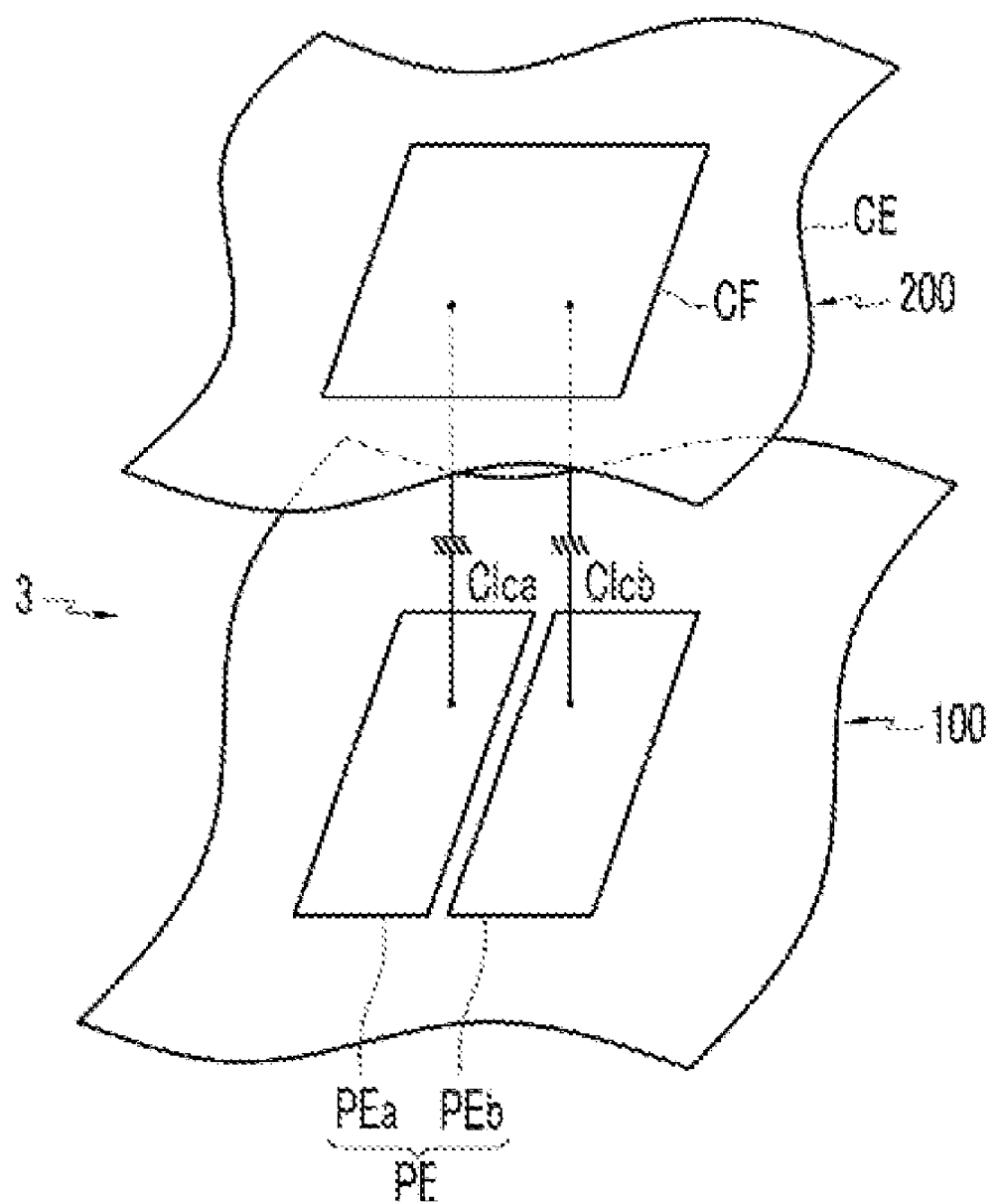
FIG. 2 is an equivalent circuit diagram of two sub-pixels of an LCD according to an exemplary embodiment of the present invention.

FIG. 1 is a block diagram of an LCD according to an exemplary embodiment of the present invention, and FIG. 2 is an equivalent circuit diagram of two sub-pixels of an LCD according to an exemplary embodiment of the present invention.

As shown in FIG. 1, the LCD includes an LC panel assembly 300, a gate driver 400 and a data driver 500 that are connected to the LC panel assembly 300, a gray voltage generator 800 connected to the data driver 500, and a signal controller 600 for controlling the gate driver 400 and the data driver 500.

The LC panel assembly 300 includes a plurality of signal lines (not shown), and a plurality of pixels PX connected to the signal lines and arranged substantially in a matrix. The LC panel assembly 300 includes lower and upper panels 100 and 200 that face each other with an LC layer 3 interposed therebetween, as shown in FIG. 2.

The signal lines include a plurality of gate lines (not shown) for transmitting gate signals (also referred to as "scanning signals") and a plurality of data lines (not shown) for transmitting data signals. The gate lines extend substantially in a row direction and are substantially parallel to each other, and the data lines extend substantially in a column direction and are substantially parallel to each other.

Each pixel PX includes a pair of sub-pixels, and each sub-pixel includes an LC capacitor Clca or Clcb. At least one of the two sub-pixels includes a switching element (not shown) connected to a gate line, a data line, and the LC capacitor Clca or Clcb.

The LC capacitor Clca/Clcb includes a sub-pixel electrode PEa/PEb provided on the lower panel 100 and a common electrode CE provided on the upper panel 200 as its two terminals, and the LC layer 3 disposed between the sub-pixel electrode PEa/PEb and the common electrode CE functions as a dielectric of the LC capacitor Clca/Clcb. The sub-pixel electrodes PEa and PEb are separated from each other and together form a pixel electrode PE. The common electrode CE is supplied with a common voltage Vcom and covers an entire surface of the upper panel 200. The LC layer 3 has negative dielectric anisotropy, and LC molecules in the LC layer 3 may be oriented so that long axes of the LC molecules are substantially perpendicular to the two panels 100 and 200 in the absence of an electric field.

To implement color display, each pixel PX uniquely displays one of the primary colors (e.g., spatial division) or each pixel PX sequentially displays the primary colors in time (e.g., temporal division) such that the spatial or temporal sum of the primary colors is recognized as a desired color. An example of a set of the primary colors includes red, green, and blue colors. FIG. 2 shows an example of the spatial division in which each pixel PX includes a color filter CF representing one of the primary colors in an area of the upper panel 200. Unlike that shown in FIG. 2, the color filter CF may be provided on or under the sub-pixel electrode PEa/PEb provided on the lower panel 100.

Polarizers (not shown) are provided on the outer surface of the panels 100 and 200, and polarization axes of two polarizers may be perpendicular to each other. One of the two polarizers may be omitted when the LCD is a reflective LCD. In the case of perpendicular polarizers, light that is incident to the LC layer 3 in the absence of an electric field cannot pass through the polarizer.

Referring to FIG. 1 again, the gray voltage generator 800 generates a plurality of gray voltages (or reference gray voltages) related to the transmittance of the pixels PX. However, the gray voltage generator 800 may generate only a given number of gray voltages instead of generating all of the gray voltages.

The gate driver 400 is connected to the gate lines of the LC panel assembly 300 and synthesizes a gate-on voltage Von and a gate-off voltage Voff from an external device to generate gate signals Vg for application to the gate lines.

The data driver 500 is connected to the data lines of the LC panel assembly 300, and applies data voltages Vd, which are selected from the gray voltages supplied from the gray voltage generator 800, to the data lines. However, in the case when the gray voltage generator 800 supplies only reference gray voltages of a predetermined number instead of supplying voltages for all grays, the data driver 500 divides the reference gray voltages to generate gray voltages for all grays, from which data signals are selected.

Each of the elements 400, 500, 600, and 800 mentioned above may be directly mounted on the LC panel assembly 300 in the form of at least one integrated circuit (IC) chip. The IC chip may be mounted on a flexible printed circuit film (not shown) in a tape carrier package (TCP) type that is attached to the LC panel assembly 300, or the IC chip may be mounted on a separate printed circuit board (not shown). On the other hand, each of the elements 400, 500, 600, and 800 may be integrated into the LC panel assembly 300. Also, the elements 400, 500, 600, and 800 may be integrated into a single chip, and in this case, at least one thereof or at least one circuit element forming them may be located outside of the single chip.

Now, the operation of the LCD will be described in further detail.

The signal controller 600 is supplied with input image signals R, G, and B and input control signals for controlling the display thereof from an external graphics controller (not shown). The input image signals R, G and B include luminance information of each pixel PX, and the luminance information has a predetermined number of, for example, 1024 ($=2^{10}$), 256 ($=2^8$), or 64 ($=2^6$) grays. The input control signals include, for example, a vertical synchronization signal Vsync, a horizontal synchronization signal Hsync, a main clock signal MCLK, and a data enable signal DE.

On the basis of the input control signals and the input image signals R, G, and B, the signal controller 600 processes the input image signals R, G, and B for operating the LC panel assembly 300 and generates gate control signals CONT1 and data control signals CONT2. Then, the signal controller 600 transmits the gate control signals CONT1 to the gate driver 400 and transmits the processed image signals DAT and the data control signals CONT2 to the data driver 500. The output image signals DAT are digital signals having a predetermined number of values (or grays).

The gate control signals CONT1 include a scanning start signal STV for instructing scanning to start and at least one clock signal for controlling the output time of the gate-on voltage Von. The gate control signals CONT1 may further include an output enable signal OE for defining the duration of the gate-on voltage Von.

The data control signals CONT2 include a horizontal synchronization start signal STH for indicating a start of image data transmission for a packet of sub-pixels, a load signal LOAD for instructing the data signals to be applied to the LC panel assembly 300, and a data clock signal HCLK. The data control signal CONT2 may further include an inversion signal RVS for reversing the polarity of the data signals with respect to the common voltage Vcom (hereinafter, "polarity of the data signals with respect to the common voltage Vcom" is referred to as "polarity of the data signals").

Responding to the data control signals CONT2 from the signal controller 600, the data driver 500 sequentially receives the digital image signals DAT for the packet of sub-pixels, selects gray voltages corresponding to respective digital image signals DAT, converts the digital image signals DAT into analog data signals, and applies the analog data signals to corresponding data lines.

The gate driver 400 applies the gate-on voltage Von to the gate lines in response to the gate control signals CONT1 from the signal controller 600, thereby turning on the switching elements connected to the gate lines. Then, data signals applied to the data lines are applied to corresponding sub-pixels through the turned-on switching elements.

Here, when a first sub-pixel electrode 191a and a second sub-pixel electrode 191b forming a pixel electrode 191 are coupled to respective switching elements, in other words, each sub-pixel has its own switching element, the two sub-pixels may be supplied with respective data voltages Vd at different times through the same data line or through different data lines or at the same time through different data lines. On the other hand, when the first sub-pixel electrode 191a is connected to a switching element (not shown) and the second sub-pixel electrode 191b is capacitively coupled to the first sub-pixel electrode 191a, only the first sub-pixel electrode 191a is supplied with data voltages Vd through the switching element, and the second sub-pixel electrode 191b is supplied with voltages that are dependent on the voltages supplied to the first sub-pixel electrode 191a. Here, the voltage of the first sub-pixel electrode 191a having a relatively small area is higher than the voltage of the second sub-pixel electrode 191b having a relatively large area.

In this way, when the voltage difference is generated across the first or second LC capacitor Clca or Clcb, a primary electric field that is substantially perpendicular to the surfaces of the panels 100 and 200 is generated in the LC layer 3. The pixel electrode 191 and a common electrode 270 may be together referred to as "field generating electrodes". Then, the LC molecules in the LC layer 3 tilt in response to the electric field such that their long axes become perpendicular to the electric field direction, and the degree of the tilt of the LC molecules determines the change of the polarization of light that is incident to the LC layer 3. This change of the light polarization causes a change of light transmittance through the polarizers, and thus, the LCD displays images.

The tilt angle of the LC molecules depends on the strength of the electric field. Since the voltages of the two LC capacitors Clca and Clcb are different from each other, the tilt angles of the LC molecules are also different from each other, and thus, the luminances of the two sub-pixels are different from each other. Therefore, the voltage of the first LC capacitor Clca and the voltage of the second LC capacitor Clcb can be adjusted so that an image viewed from a lateral side is similar to an image viewed from the front, in other words, a lateral gamma curve can be made to be similar to a frontal gamma curve, thereby improving the lateral visibility.

Also, when the area of the first sub-pixel electrode 191a applied with a higher voltage is formed to be smaller than the area of the second sub-pixel electrode 191b, the lateral gamma curve further approaches the frontal gamma curve. Particularly, when the area ratio of the first and the second sub-pixel electrodes 191a and 191b is approximately 1:2 to 1:3 as illustrated in FIG. 4 to FIG. 7B, the lateral gamma curve is much more similar to the frontal gamma curve, thereby further improving the lateral visibility.

By repeating this procedure for a horizontal period (which is denoted as "1H" and is equal to one period of the horizontal synchronization signal Hsync and the data enable signal DE), all pixels PX are applied with data signals, thereby displaying an image for a frame.

When the next frame starts after one frame is finished, the inversion signal RVS applied to the data driver 500 is controlled such that the polarity of the data signals applied to each pixel PX is reversed to be opposite to the polarity in the previous frame (which is referred to as "frame inversion"). Here, even during one frame, the polarity of the data signal flowing in a data line may vary in accordance with the characteristics of the inversion signal RVS (which is referred to as "row inversion" and/or "dot inversion"), or the polarities of the data signals applied to a packet of pixels may be different from each other (which is referred to as "column inversion" and/or "dot inversion").

Now, a structure of an LC panel assembly according to an exemplary embodiment of the present invention will be described in detail with reference to FIG. 3 to FIG. 15 along with FIG. 1 and FIG. 2 described above.

Figure 3:
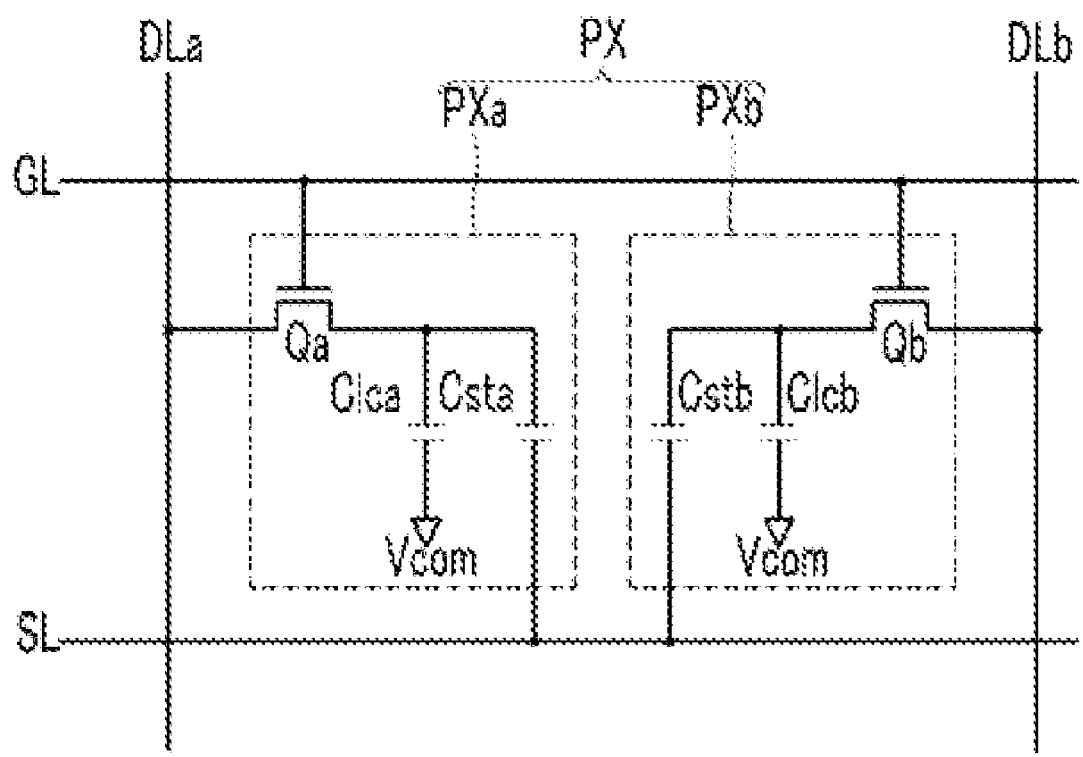
FIG. 3 is an equivalent circuit diagram of a pixel of a liquid crystal (LC) panel assembly according to an exemplary embodiment of the present invention.

FIG. 3 is an equivalent circuit diagram of a pixel of an LC panel assembly according to an exemplary embodiment of the present invention.

Referring to FIG. 3, an LC panel assembly includes signal lines including a plurality of gate lines GL, a plurality of pairs of data lines DLa and DLb, and a plurality of storage electrode lines SL and a plurality of pixels PX connected to the signal lines.

Each pixel PX includes a pair of sub-pixels PXa and PXb, and each sub-pixel PXa/PXb includes a switching element Ga/Gb that is respectively connected to a corresponding gate line GL and a data line DLa/DLb, an LC capacitor Clca/Clcb that is connected to the switching element Qa/Qb, and a storage capacitor Csta/Cstb that is connected to the switching element Qa/Qb and the storage electrode line SL.

Each switching element Qa/Qb including a thin film transistor (TFT) is a three-terminal element provided on the lower panel 100, and it has a control terminal connected to a gate line GL, an input terminal connected to a data line DLa/DLb, and an output terminal connected to an LC capacitor Clca/Clcb and a storage capacitor Csta/Cstb.

The storage capacitor Csta/Cstb that functions as an auxiliary capacitor for the LC capacitor Clca/Clcb is formed by overlapping a storage electrode line SL that is provided on the lower panel 100 with a sub-pixel electrode PXa/PXb via an insulator disposed therebetween, and the storage electrode line SL is supplied with a predetermined voltage such as the common voltage Vcom. Alternatively, the storage capacitors Csta and Cstb may be formed by overlapping the sub-pixel electrodes PXa and PXb with a previous gate line directly thereabove via an insulator.

Here, a detailed description of the LC capacitors Clca and Clcb, which were described above, will be omitted.

In an LCD including this LC panel assembly, the signal controller 600 may receive input image signals R, G and B for a pixel PX and convert them into output image signals DAT for two sub-pixels PXa and PXb, which are transmitted to the data driver 500. On the other hand, separate sets of gray voltages for the two sub-pixels PXa and PXb may be generated by the gray voltage generator 800, wherein the sets of gray voltages are alternately applied to the data driver 500 or alternately selected by the data driver 500, thereby applying different voltages to the two sub-pixels PXa and PXb. However, it is preferable to compensate the image signals or generate sets of gray voltages such that the merged gamma curve of the two sub-pixels PXa and PXb is close to the frontal reference gamma curve. For example, the frontal merged gamma curve is made to accord with the frontal reference gamma curve that is determined to be appropriate for the LC panel assembly, and the lateral merged gamma curve is made to be similar to the frontal reference gamma curve.

Now, an example of the LC panel assembly illustrated in FIG. 3 will be described in detail with reference to FIG. 4 to FIG. 10 along with FIG. 1 and FIG. 2 described above.

Figure 4:
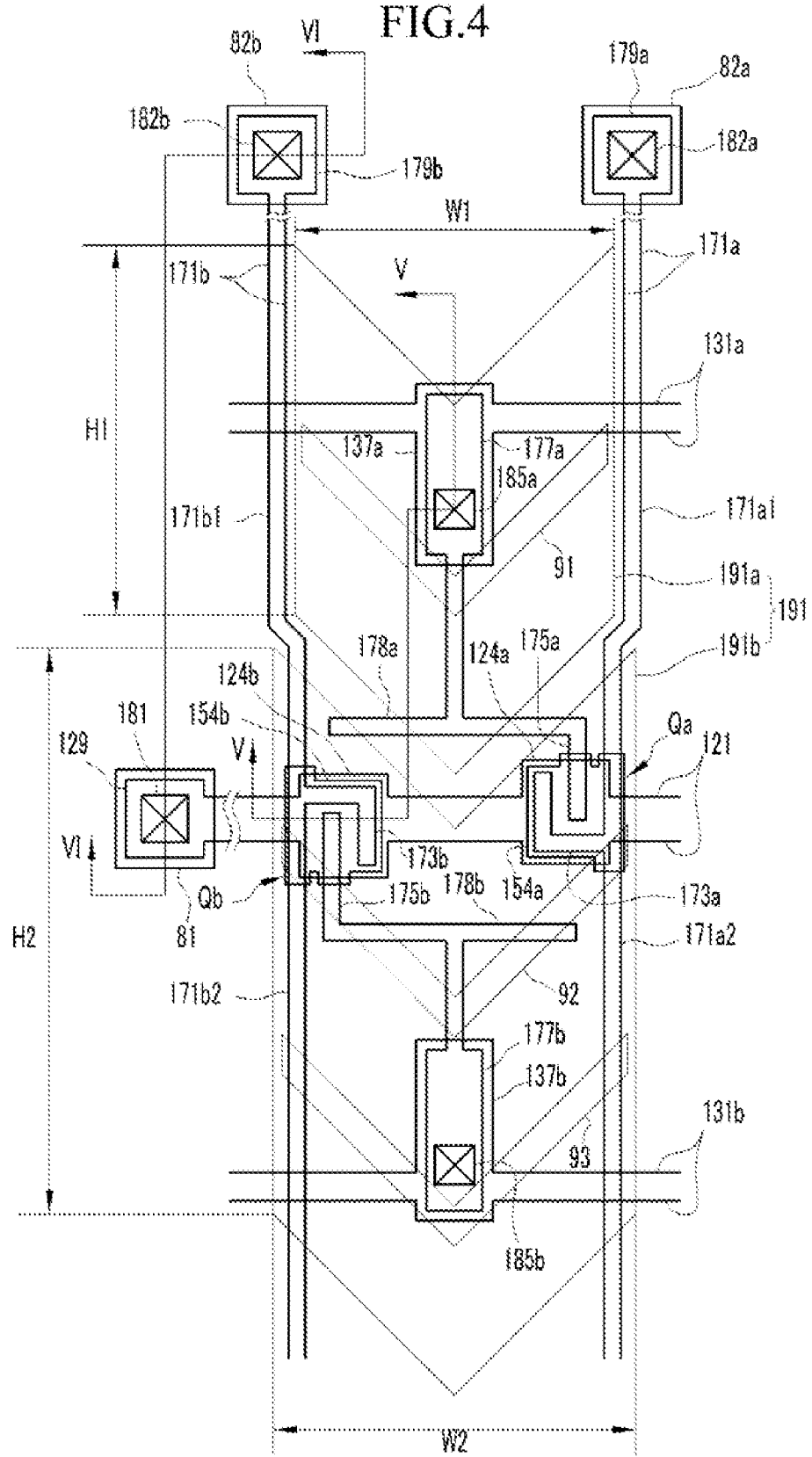
FIG. 4 is a layout view of an LC panel assembly according to an exemplary embodiment of the present invention.
Figure 5:
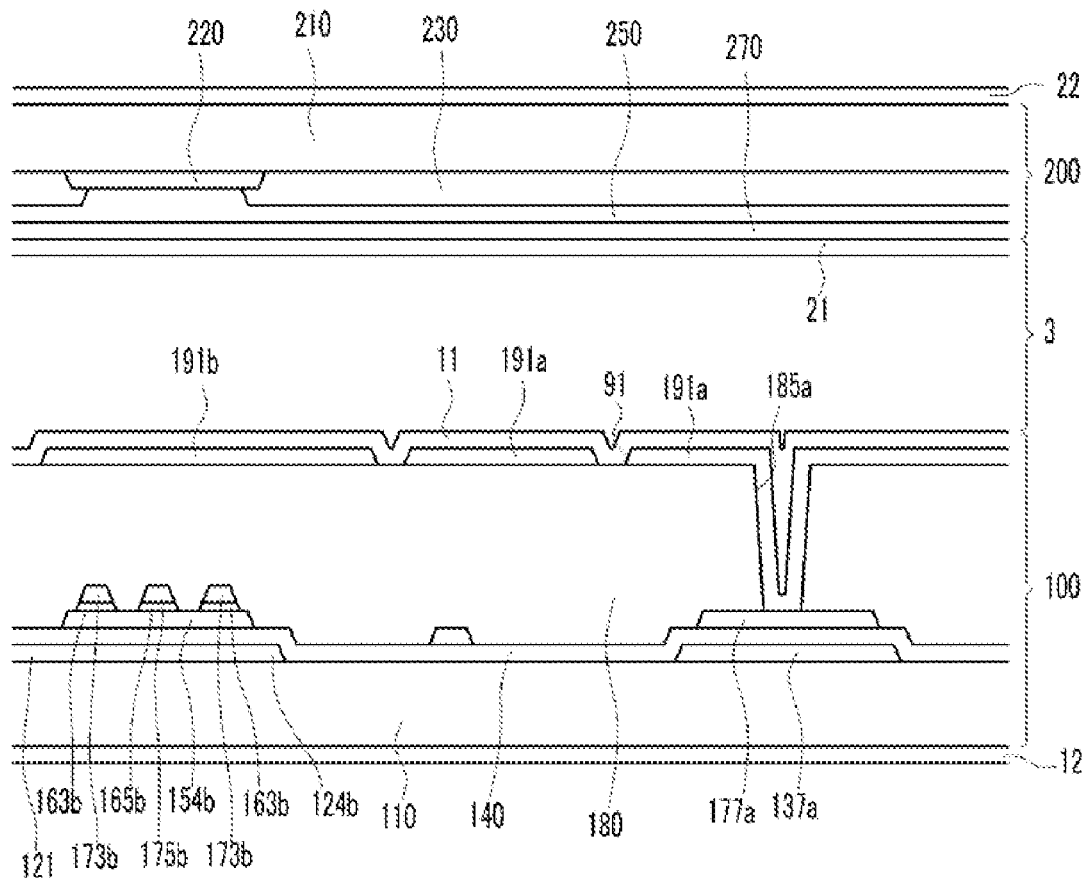
FIG. 5 and FIG. 6 are cross-sectional views of the LC panel assembly illustrated in FIG. 4 taken along line V-V and line VI-VI, respectively.
Figure 6:
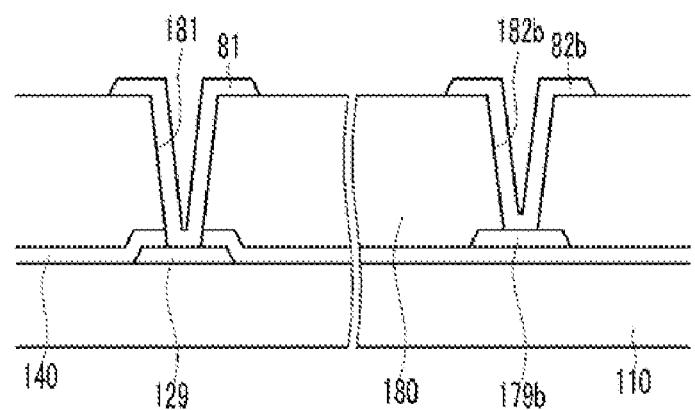
Figure 7A:
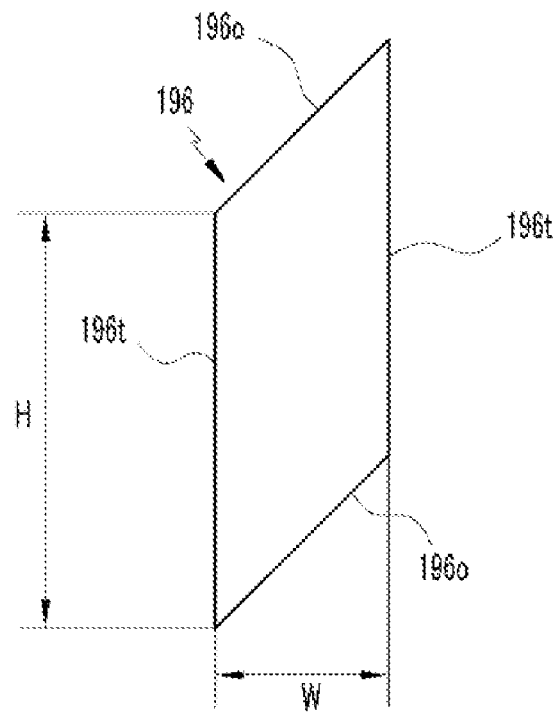
FIG. 7A and FIG. 7B are plan views of a pixel electrode of an LCD according to an exemplary embodiment of the present invention.
Figure 7B:
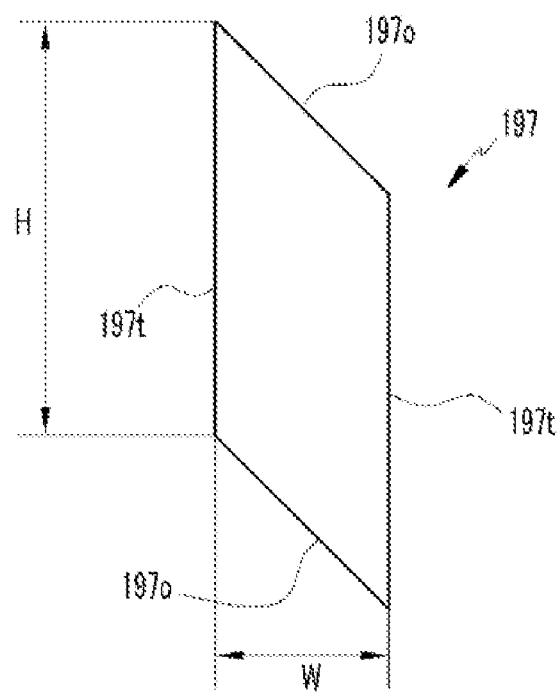

FIG. 4 is a layout view of an LC panel assembly according to an exemplary embodiment of the present invention, FIG. 5 and FIG. 6 are cross-sectional views of the LC panel assembly illustrated in FIG. 4 taken along line V-V and line VI-VI respectively, and FIG. 7A and FIG. 7B are top plan views of an electrode piece of the respective sub-pixel electrodes illustrated in FIG. 4 to FIG. 6.

Referring to FIG. 4 to FIG. 6, the LC panel assembly includes a lower panel 100 and an upper panel 200 opposing each other and an LC layer 3 interposed between the two panels 100 and 200.

First, the lower panel 100 will be described in detail.

A plurality of gate conductors including a plurality of gate lines 121 and a plurality of pairs of first and second storage electrode lines 131a and 131b are formed on an insulating substrate 110 that is preferably made of transparent glass or plastic.

The gate lines 121 for transmitting gate signals extend substantially in a transverse direction. Each of the gate lines 121 includes a plurality of pairs of first and second gate electrodes 124a and 124b protruding upward and downward and an end portion 129 having a large area for connection with another layer or the gate driver 400. When the gate driver 400 is integrated into the substrate 110, the gate lines 121 may be extended to be directly connected to the gate driver 400.

The storage electrode lines 131a and 131b are supplied with a predetermined voltage such as a common voltage Vcom and extend substantially in a transverse direction. The first and the second storage electrode lines 131a and 131b are disposed above and below the gate line 121, respectively. Each storage electrode line 131a and 131b includes a plurality of pairs of first and second storage electrodes 137a and 137b extending upward and downward. However, the shape and arrangement of the storage electrode lines 131a and 131b including the storage electrodes 137a and 137b may be modified in various ways.

The gate conductors 121, 131a, and 131b may be made of an aluminum (Al) containing metal such as Al and an Al alloy, a silver (Ag) containing metal such as Ag and a Ag alloy, a copper (Cu) containing metal such as Cu and a Cu alloy, a molybdenum (Mo) containing metal such as Mo and a Mo alloy; chromium (Cr), tantatum (Ta), and titanium (Ti). Alternatively, the gate conductors 121, 131a, and 131b may have a multi-layered structure including two conductive layers (not shown) having different physical properties. One of the two conductive layers is preferably made of a low resistivity metal such as an Al-containing metal, a Ag-containing metal, or a Cu-containing metal for reducing signal delay or voltage drop. On the other hand, the other conductive layer is preferably made of a material such as a Mo-containing metal, Cr, Ti, and Ta, which has good physical, chemical, and electrical contact characteristics with other materials such as indium tin oxide (ITO) and indium zinc oxide (IZO). Examples of the combination of two layers include a pair of a lower Cr layer and an upper Al (alloy) layer and a pair of a lower Al (alloy) layer and an upper Mo (alloy) layer. However, the gate conductors 121, 131a, and 131b may be made of many various metals or conductors.

The lateral sides of the gate conductors 121, 131a, and 131b are inclined relative to a surface of the substrate 110, and the preferable inclination angle thereof ranges from about 30 degrees to about 80 degrees.

A gate insulating layer 140 preferably made of silicon nitride (SiNx) or silicon oxide (SiOx) is formed on the gate conductors 121, 131a, and 131b.

A plurality of first and second semiconductor islands 154a and 154b preferably made of hydrogenated amorphous silicon (a-Si) or polysilicon are formed on the gate insulating layer 140. The first and second semiconductors 154a and 154b are disposed on the first and second gate electrodes 124a and 124b, respectively.

A pair of ohmic contact islands (not shown) is formed on each of the first semiconductor islands 154a, and a pair of ohmic contact islands 163b and 165b are formed on each of the second semiconductor islands 154b. The ohmic contacts 163b and 165b are preferably made of n+ hydrogenated a-Si heavily doped with an n-type impurity such as phosphorus (P) or silicide.

The lateral sides of the semiconductors 154a and 154b and the ohmic contacts 163b and 165b are also inclined relative to a surface of the substrate 110, and the preferable inclination angle thereof ranges from about 30 degrees to about 80 degrees.

A plurality of data conductors including a plurality of pairs of data lines 171a and 171b and a plurality of pairs of first and second drain electrodes 175a and 175b are formed on the ohmic contacts 163b and 165b and the gate insulating layer 140.

The first and the second data lines 171a and 171b for transmitting data signals extend substantially in the longitudinal direction, and intersect the gate lines 121 and the storage electrode lines 131a and 131b. Each data line 171a and 171b is curved once midway. Each of the data lines 171a and 171b includes a plurality of pairs of first and second source electrodes 173a and 173b branched out toward the first and second gate electrodes 124a and 124b and an end portion 179a and 179b having a large area for connection with another layer or a data driver 500. When the data driver 500 is integrated into the substrate 110, the data lines 171a and 171b may be extended to be directly connected to the data driver 500.

The first and the second drain electrodes 175a and 175b are separated from each other and are also separated from the data lines 171a and 171b. The first/second drain electrode 175a/175b opposes the first/second source electrode 173a/173b with respect to the first/second gate electrode 124a/124b and includes an end portion 177a/177b having a large area and another stick-shaped end portion. The two end portions 177a and 177b having a large area overlap the first and second storage electrodes 137a and 137b, respectively, and the stick-shaped end portions are partially surrounded by the first and second source electrodes 173a and 173b that are curved. Also, each of the first and the second drain electrode 175a and 175b includes a branch 178a and 178b extending parallel to the gate line 121, respectively. The branches 178a and 178b maintain the symmetry of the pixel PX.

The first/second gate electrode 124a/124b, the first/second source electrode 173a/173b, and the first/second drain electrode 175a/175b, along with the first/second semiconductor 154a/154b, form a first/second TFT Qa/Qb having a channel formed in the first/second semiconductor 154a/154b disposed between the first/second source electrode 173a/173b and the first/second drain electrode 175a/175b. The first/second TFT Qa/Qb is disposed on the left/right side of the data line 171a/171b, respectively.

The data conductors 171a, 171b, 175a, and 175b are preferably made of a refractory metal such as Mo, Cr, Ta, and Ti or an alloy thereof. Also, the data line 171 and the drain electrode 175 may have a multi-layered structure including a refractory metal layer (not shown) and a conductive layer (not shown) having low resistivity. An example of the multi-layered structure includes double layers of a lower Cr or Mo (alloy) layer and an upper Al (alloy) layer, and triple layers of a lower Mo (alloy) layer, an intermediate Al (alloy) layer, and an upper Mo (alloy) layer. However, the data conductors 171a, 171b, 175a, and 175b may be made of many various metals or conductive materials.

The lateral sides of the data conductors 171a, 171b, 175a, and 175b are also inclined relative to a surface of the substrate 110, and the inclination angles thereof are preferably in a range of about 30 degrees to about 80 degrees.

The ohmic contacts 163b and 165b are interposed only between the underlying semiconductors 154a and 154b and the overlying data conductors 171a, 171b, 175a, and 175b thereon and reduce the contact resistance therebetween. The semiconductors 154a and 154b include exposed portions that are not covered with the data conductors 171a, 171b, 175a, and 175b such as portions located between the source electrodes 173a and 173b and the drain electrodes 175a and 175b.

A passivation layer 180 is formed on the data conductors 171a, 171b, 175a, 175b and the exposed portions of the semiconductors 154a and 154b. The passivation layer 180 is preferably made of an inorganic insulator or an organic insulator and the surface thereof may be flat. The organic insulator may have photosensitivity and the preferable dielectric constant thereof is lower than about 4.0. However, the passivation layer 180 may have a double-layered structure including a lower inorganic layer and an upper organic layer so as not to harm the exposed portions of the semiconductors 154a and 154b and to take advantage of the excellent insulating characteristics of an organic layer.

The passivation layer 180 has a plurality of contact holes 182, 185a, and 185b respectively exposing the end portions 179a and 179b of the data lines 171a and 171b and the large end portions 177a and 177b of the first and second drain electrodes 175a and 175b and the passivation layer 180 and the gate insulating layer 140 have a plurality of contact holes 181 respectively exposing the end portions 129 of the gate lines 121.

A plurality of pixel electrodes 191 and a plurality of contact assistants 81, 82a, and 82b are formed on the passivation layer 180. These may be made of a transparent conductor such as ITO or IZO, or a reflective metal such as Al, Ag, Cr, or an alloy thereof.

Each of the pixel electrodes 191 opposes a color filter CF that is formed on the upper panel 200 and represents one of the primary colors such as the three primary colors of red (R), green (G), and blue (B), respectively. Each pixel electrode 191 includes a pair of first and second sub-pixel electrodes 191a and 191b that are separated from each other.

Each of the first and the second sub-pixel electrode 191a and 191b includes at least one parallelogrammic electrode piece 196 as illustrated in FIG. 7A and one parallelogrammic electrode piece 197 as illustrated in FIG. 7B.

As shown in FIG. 7A and FIG. 7B each of the electrode pieces 196 and 197 has a pair of oblique edges 196o and 197o and a pair of lengthwise edges 196t and 197t and substantially has a shape of a parallelogram. Each oblique edge 196o and 197o forms an oblique angle with the lengthwise edges 196t and 197t, and the preferable oblique angle ranges from about 45 degrees to about 135 degrees. Hereinafter, for convenience sake, the shape of the electrode piece 196 and 197 is classified according to its direction of inclination (e.g. an "inclination direction") from a perpendicular state with respect to the lengthwise edges 196t and 197t, and it is referred to as "right-inclined" when the inclination direction is rightward as shown in FIG. 7A and as "left-inclined" when the inclination direction is leftward as shown in FIG. 7B.

The distance between the lengthwise edges 196t and 197t of the electrode pieces 196 and 197, in other words, the width W, and the distance between the oblique edges 196o and 197o, in other words, the height H, may be determined in accordance with the size of the LC panel assembly 300. Also, the lengthwise edges 196t and 197t of each electrode piece 196 and 197 may be modified, for example, to be curved or projected, when considering their relationships with other parts.

Each of the first and the second sub-pixel electrode 191a and 191b has a shape formed by connecting parallelogrammic electrode pieces 196 and 197 having different inclination directions from each other in a row direction. One lengthwise edge 196t or 197t of each of the parallelogrammic electrode pieces 196 and 197 adjoins each other. One oblique edge 196o or 197o of each of the parallelogrammic electrode pieces 196 and 197 meets each other making an oblique angle with each other, and the oblique angle thereof is preferably about 90 degrees.

The first and second sub-pixel electrodes 191a and 191b are adjacent to each other in a column direction. The height H2 of the second sub-pixel electrode 191b is more than the height H1 of the first sub-pixel electrode 191a by about 1.1 times to about 2 times. The width W2 of the second sub-pixel electrode 191b is a little more than the width W1 of the first sub-pixel electrode 191a. Accordingly, the area of the second sub-pixel electrode 191b is larger than the area of the first sub-pixel electrode 191a by about 1.5 times to about 2 times. However, the present invention is not limited to this size, and the height H1 and H2 and the width W1 and W2 of the first and second sub-pixel electrodes 191a and 191b may be adjusted to obtain a desired area ratio, preferably about 1:1.1 to 1:3.

In this way, each of the first and the second sub-pixel electrode 191a and 191b has a shape that is curved in the horizontal direction once. As a result, it becomes easier to form a region for three pixel electrodes 191 corresponding to color filters CF representing the three primary colors of red (R), green (G), and blue (B), respectively. Also, it is easy to adjust the overlapped area with the data lines 171a and 171b.

The first sub-pixel electrode 191a has a cutout 91, and the second sub-pixel electrode has cutouts 92 and 93. Each of the cutouts 91, 92, and 93 includes two oblique edges that are substantially parallel to the oblique edges 196o and 197o of the parallelogrammic electrode pieces 196 and 197 forming the first and second sub-pixel electrodes 191a and 191b. The number, shape, and arrangement of the cutouts 91, 92, and 93 may be modified in various ways.

The first and second sub-pixel electrodes 191a and 191b are divided into a plurality of sub-regions with respect to the cutouts 91, 92, and 93. Each of the sub-regions includes two primary edges defined by the oblique edges of the cutouts 91, 92, and 93 and the oblique edges 196o and 197o of the electrode pieces 196 and 197.

The edges of the sub-pixel electrodes 191a and 191b and the cutouts 91, 92, and 93 of the electric field-generating electrodes 191 and 270 distort the primary electric field and give it a horizontal component, which initially determines the tilt directions of the LC molecules. The horizontal component of the primary electric field is perpendicular to the edges of the sub-pixel electrodes 191a and 191b and the edges of the cutouts 91, 92, and 93.

Since the LC molecules on each sub-area divided by the cutouts 91, 92, and 93 substantially tilt vertically to the primary edges, the azimuthal distribution of the tilt directions is localized to four directions. In this way, if tilt directions of the LC molecules are numerous, the reference viewing angle of the LCD is increased.

Meanwhile, the direction of a secondary electric field that is generated due to the voltage difference between the sub-pixel electrodes 191a and 191b is perpendicular to each of the primary edges of the sub-areas. Accordingly, the direction of the secondary electric field coincides with that of the horizontal component of the primary electric field. Consequently, the secondary electric field between the sub-pixel electrodes 191a and 191b enhances the determination of the tilt directions of the LC molecules.

The first sub-pixel electrodes 191a are connected to each of the first drain electrodes 175a through the contact holes 185a, and the second sub-pixel electrodes 191b are connected to each of the second drain electrodes 175b through the contact holes 185b.

The first sub-pixel electrode 191a does not overlap the first and second data lines 171a and 171b, and the second sub-pixel electrode 191b overlaps the first and second data lines 171a and 171b via the passivation layer 180 interposed therebetween. Each of the first and the second data line 171a and 171b includes a first portion 171a1 and 171b1 that is adjacent to but does not overlap the first sub-pixel electrode 191a and a second portion 171a2 and 171b2 overlapping the second sub-pixel electrode 191b. The first portion 171a1/171b1 and the second portion 171a2/171b2 are curved to each other.

Figure 9:
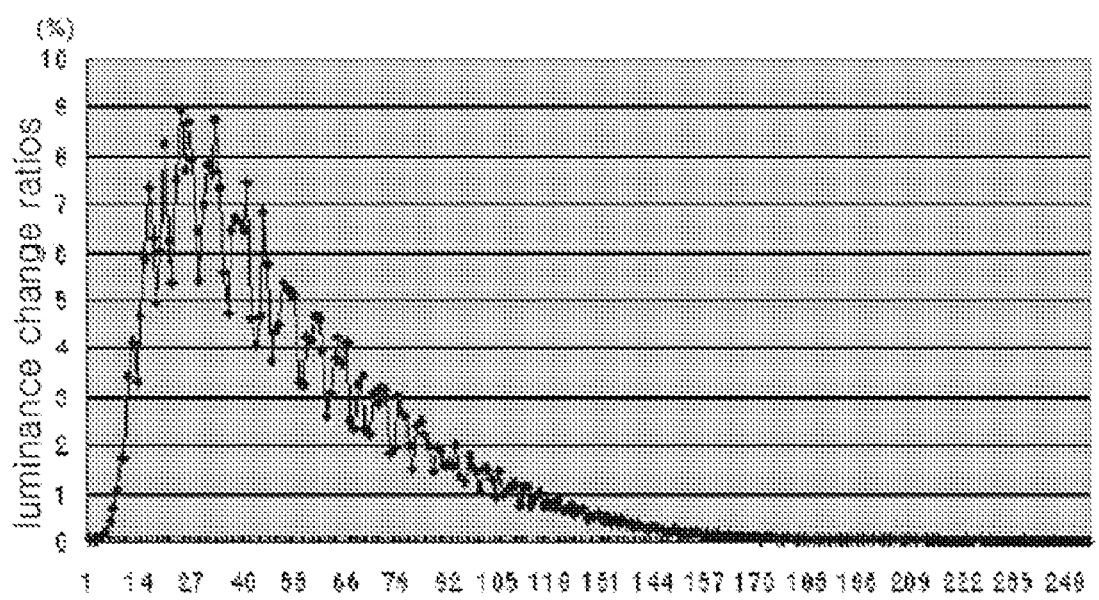
FIG. 9 is a graph illustrating luminance change ratios according to grays when a voltage is changed by a predetermined amount at a first sub-pixel electrode of an LCD according to an exemplary embodiment of the present invention.
Figure 10:
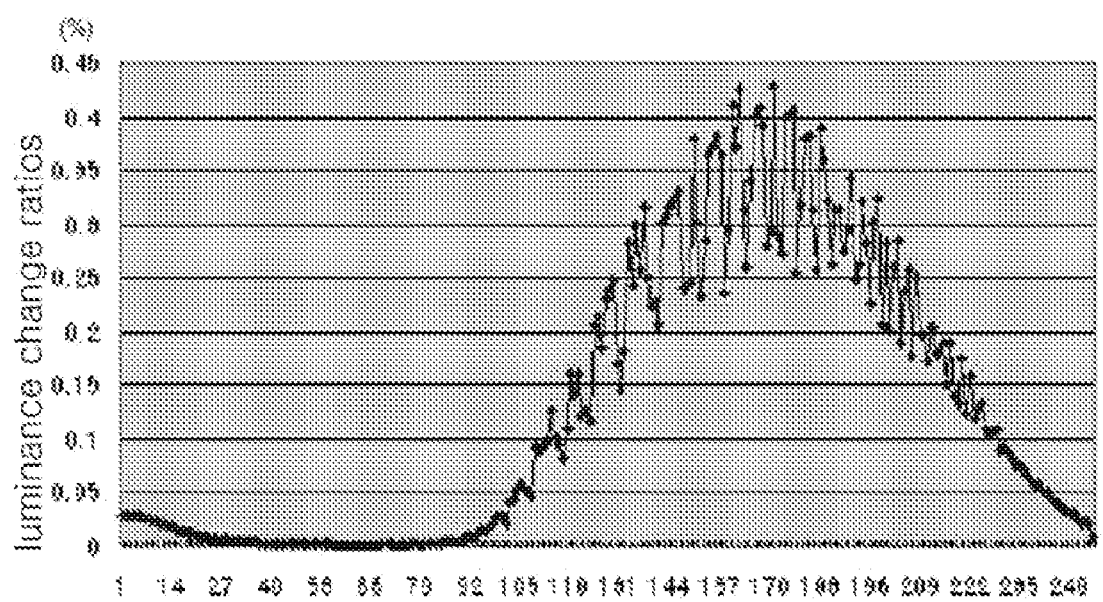
FIG. 10 is a graph illustrating luminance change ratios according to grays when a voltage is changed by a predetermined amount at a second sub-pixel electrode of an LCD according to an exemplary embodiment of the present invention.

Hereinafter, the overlapping relationship between the data lines 171a and 171b and the pixel electrode 191 will be described in detail with reference to FIG. 8 to FIG. 10.

Figure 8:
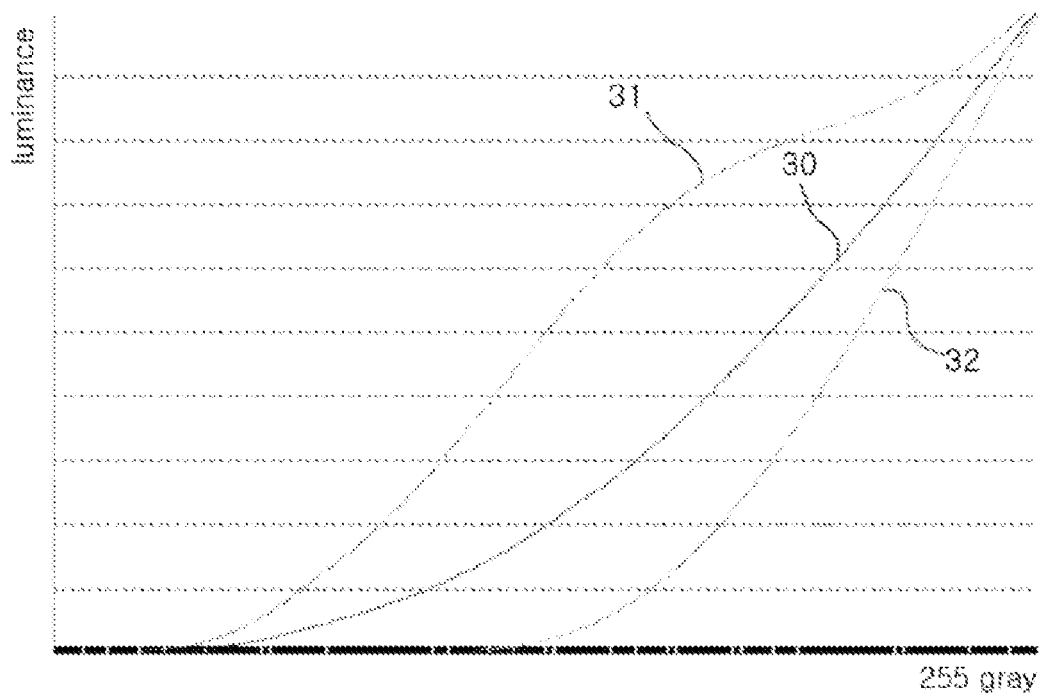
FIG. 8 is a graph illustrating a gamma curve of an LCD according to an exemplary embodiment of the present invention.

FIG. 8 is a graph illustrating a gamma curve of a pixel electrode for each gray. FIG. 9 is a graph illustrating total luminance change ratios according to voltage changes of a first sub-pixel electrode 191a, and FIG. 10 is a graph illustrating total luminance change ratios according to voltage changes of a second sub-pixel electrode 191b.

Parasitic capacitances are generated between the data lines 171a and 171b and the pixel electrode 191. The pixel electrode voltage is affected by varying parasitic capacitances. Since the first sub-pixel electrode 191a and the second sub-pixel electrode 191b are applied with different voltages, the luminance change ratios of the first sub-pixel electrode 191a and the second sub-pixel electrode 191b are different even though the pixel electrode voltage is varied by the same amount according to the parasitic capacitances.

Referring to FIG. 8, a gamma curve 31 of a first sub-pixel electrode, a gamma curve 32 of a second sub-pixel electrode, and an average gamma curve 30 of a pixel electrode for each gray are illustrated. In the low grays where luminance varies sensitively in response to a small change of voltage, the voltage change ratio of the first sub-pixel electrode is great while the voltage change ratio of the second sub-pixel electrode is almost zero. In the high grays where luminance does not vary sensitively in response to a voltage change, the voltage change ratio of the first sub-pixel electrode is small while the voltage change ratio of the second sub-pixel electrode is great.

When described again referring to FIG. 9 and FIG. 10, the luminance change ratio of the first sub-pixel electrode 191a in the low grays comes up to about 9%. On the other hand, the luminance change ratio of the second sub-pixel electrode 191b in the low grays is nearly 0% since it is in an off state while the luminance change ratio thereof increases when going up to the high grays. However, the luminance change ratio of the second sub-pixel electrode 191b in the high grays is maximally about 0.45%, which is very small compared to the luminance change ratio of the first sub-pixel electrode 191a.

Therefore, like that shown in FIG. 4 the first sub-pixel electrode 191a, which has a sensitive luminance change ratio, does not overlap the data lines 171a and 171b, thereby preventing a luminance change due to a parasitic capacitance. Also, the data lines 171a and 171b overlap the second sub-pixel electrode 191b, which has a relatively insensitive luminance change ratio, thereby ensuring a sufficient aperture ratio.

Referring to FIG. 4 again, the storage electrode lines 131a and 131b, the large end portions 177a and 177b of the drain electrodes 175a and 175b, and the contact holes 185a and 185b are located on the transverse center-line of the sub-pixel electrodes 191a and 191b. A straight line connecting the curve points of the sub-pixel electrodes 191a and 191b is the boundary of the sub-areas described above, where the arrangements of the LC molecules are disordered to yield texture. Therefore, the aperture ratio can be improved while blocking the texture.

The first/second sub-pixel electrode 191a/191b and the common electrode 270 provided on the upper panel 200 along with the LC layer 3 disposed therebetween form a first/second LC capacitor Clca/Clcb respectively to store applied voltages even after the TFT Qa/Qb is turned of.

A first/second sub-pixel electrode 191a/191b and a first/second drain electrode 175a/175b connected thereto overlap a storage electrode 137a/137b via the gate insulating layer 140 interposed therebetween to form a first/second 27 storage capacitor Csta/Cstb, and the first/second storage capacitor Csta/Cstb enhances the voltage storing capacity of the first/second LC capacitor Clca/Clcb.

The contact assistants 81 and 82 are connected to the end portion 129 of the gate line 121 and the end portion 179 of the data line 171 through the contact holes 181 and 182, respectively. The contact assistants 81 and 82 supplement the adhesive property of the end portions 129 of the gate lines 121 and the end portions 179 of the data lines 171 to exterior devices, and protect them.

Next, the description of the upper panel 200 follows.

A light blocking member 220 is formed on an insulating substrate 210 that is preferably made of transparent glass or plastic. The light blocking member 220 includes curved portions facing the curved edges of the pixel electrodes 191 and quadrilateral portions facing the TFTs, and the light blocking member 220 defines opening areas opposed to the pixel electrodes 191a and also prevents the leakage of light between the pixel electrodes 191.

A plurality of color fitters 230 are also formed on the substrate 210 and the light blocking member 220. The color filters 230 are disposed substantially in the areas enclosed by the light blocking member 220 and may extend in a longitudinal direction substantially along the pixel electrodes 191. Each of the color fitters 230 may represent one of the primary colors such as red, green, and blue.

An overcoat 250 is formed on the color fitters 230 and the light blocking member 220. The overcoat 250 is preferably made of an organic insulator and it prevents the color filters 230 from being exposed and also provides a flat surface. The overcoat 250 may be omitted.

A common electrode 270 is formed on the overcoat 250. The common electrode 270 is preferably made of a transparent conductive material such as ITO and IZO, and it may have a plurality of cutouts (not shown).

Alignment layers 11 and 21 are coated on inner surfaces of the panels 100 and 200, and they may be homeotropic.

Polarizers 12 and 22 are provided on outer surfaces of the panels 100 and 200 and their polarization axes may be perpendicular to each other, with one of the polarization axes preferably parallel to the gate lines 121. One of the polarizers 12 and 22 may be omitted when the LCD is a reflective LCD.

The LCD may include a backlight unit (not shown) for supplying light to the polarizers 12 and 22, a retardation film, the panels 100 and 200, and the LC layer 3.

The LC layer 3 is in a state of negative dielectric anisotropy, and the LC molecules in the LC layer 3 are aligned such that their long axes are substantiality vertical to the surfaces of the panels 100 and 200 in the absence of an electric field.

Cutouts 91, 92, and 93 may be substituted by protrusions (not shown) or depressions (not shown).

The protrusions may be made of an organic or inorganic material and may be disposed on or under the field-generating electrodes 191 and 270.

Next, another example of the LC panel assembly illustrated in FIG. 3 will be described in detail with reference to FIG. 11.

Figure 11:
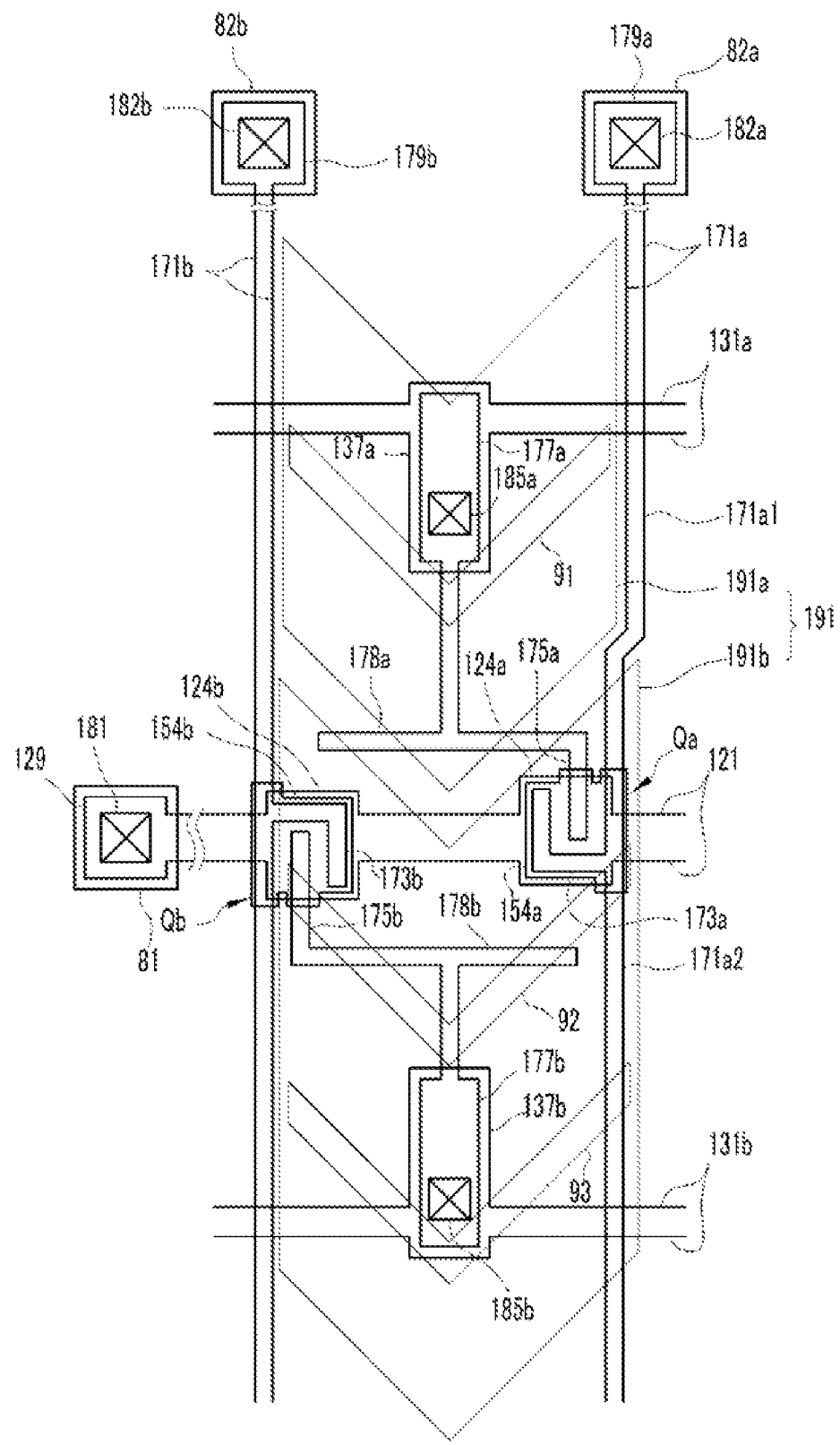
FIG. 11 is a layout view of an LC panel assembly according to an exemplary embodiment of the present invention.

FIG. 11 is a layout view of an LC panel assembly according to an exemplary embodiment of the present invention.

Referring to FIG. 11, the LC panel assembly includes a lower panel (not shown), an upper panel (not shown), and an LC layer (not shown) interposed therebetween.

The layered structure of the LC panel assembly according to the present exemplary embodiment is similar to the layered structure of the LC panel assembly illustrated in FIG. 4 to FIG. 6.

Regarding the lower panel, a plurality of gate conductors including a plurality of gate lines 121 and a plurality of pairs of storage electrode lines 131a and 131b are formed on an insulating substrate (not shown). Each of the gate lines 121 includes first and second gate electrodes 124a and 124b and an end portion 129. A gate insulating layer (not shown) is formed on the gate conductors 121, 131 a, and 131b. A plurality of semiconductors 154a and 154b are formed on the gate insulating layer, and a plurality of ohmic contacts (not shown) are formed thereon. Data conductors including a plurality of data lines 171a and 171b and a plurality of first and second drain electrodes 175a and 175b are formed on the ohmic contacts. Each of the data lines 171a and 171b includes a plurality of first and second source electrodes 173a and 173b and an end portion 179a and 179b, and the drain electrodes 175a and 175b include end portions 177a and 177b having a large area. A passivation layer (not shown) is formed on the data conductors 171a, 171b, 175a, and 175b and exposed portions of the semiconductors 154a and 154b, and the passivation layer and the gate insulating layer have a plurality of contact holes 181, 182a, 182b, 185a, and 185b. A plurality of pixel electrodes 191 including first and second sub-pixel electrodes 191a and 191b and a plurality of contact assistants 81, 82a and 82b are formed on the passivation layer. An alignment layer (not shown) is formed on the pixel electrodes 191, the contact assistants 81, 82a, and 82b, and the passivation layer.

Regarding the upper panel, a light blocking member, a common electrode, and an alignment layer are formed on an insulating substrate.

However, in the LC panel assembly according to the present exemplary embodiment, unlike the LC panel assembly illustrated in FIG. 4 to FIG. 6, the shape of the first and second data lines 171a and 171b are different from each other. The first data line 171a is curved once so that a portion thereof does not overlap the first sub-pixel electrode 191a and another portion thereof does overlap the second sub-pixel electrode 191b, like the LC panel assembly illustrated in FIG. 4. However, the second data line 191b extends straight to overlap neither of the first and second sub-pixel electrodes 191a and 191b.

In this way, by overlapping only one of a pair of data lines 171a and 171b with the second sub-pixel electrode 191b, the luminance change ratio according to a voltage change of a pixel electrode 191 is further minimized, thereby preventing vertical cross-talk.

Numerous characteristics of the LC panel assembly illustrated in FIG. 4 to FIG. 6 may also be applied to the LC panel assembly illustrated in FIG. 11.

Next, another example of the LC panel assembly illustrated in FIG. 3 will be described in detail with reference to FIG. 12.

Figure 12:
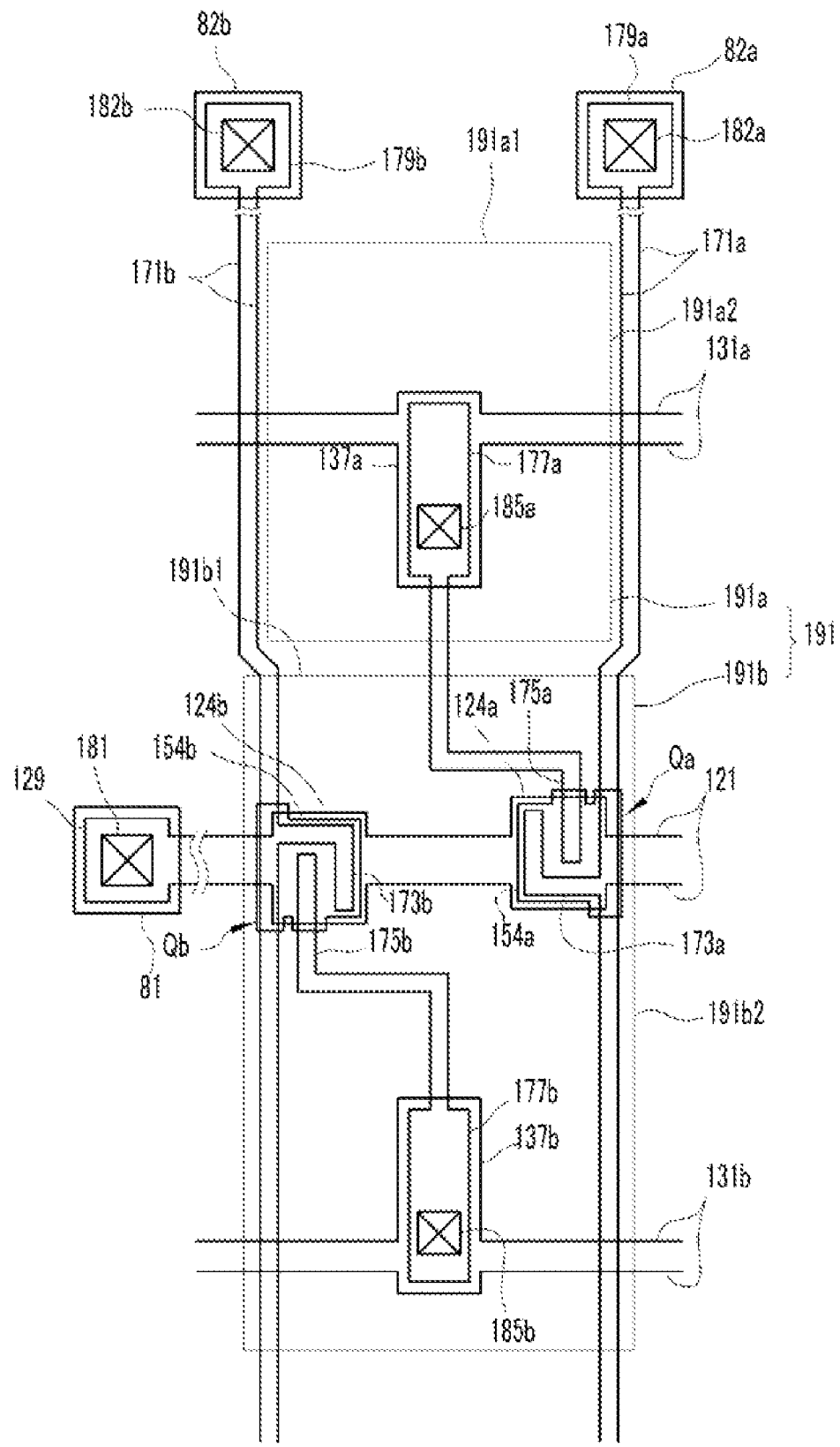
FIG. 12 is a layout view of an LC panel assembly according to an exemplary embodiment of the present invention.

FIG. 12 is a layout view of an LC panel assembly according to an exemplary embodiment of the present invention.

Referring to FIG. 12, the LC panel assembly includes a lower panel (not shown) and an upper panel (not shown) and an LC layer (not shown) interposed therebetween.

The layered structure of the LC panel assembly according to the present exemplary embodiment is similar to the layered structure of the LC panel assembly illustrated in FIG. 4 to FIG. 6.

Regarding the lower panel, a plurality of gate conductors including a plurality of gate lines 121 and a plurality of pairs of storage electrode lines 131a and 131b are formed on an insulating substrate (not shown). Each of the gate lines 121 includes first and second gate electrodes 124a and 124b and an end portion 129. A gate insulating layer (not shown) is formed on the gate conductors 121, 131 a, and 131b. A plurality of semiconductors 154a and 154b are formed on the gate insulating layer, and a plurality of ohmic contacts (not shown) are formed thereon. Data conductors including a plurality of data lines 171a and 171b and a plurality of first and second drain electrodes 175a and 175b are formed on the ohmic contacts. Each of the data lines 171a and 171b includes a plurality of first and second source electrodes 173a and 173b and an end portion 179a and 179b, and the drain electrodes 175a and 175b include end portions 177a and 177b having a large area. A passivation layer (not shown) is formed on the data conductors 171a, 171b, 175a, and 175b and exposed portions of the semiconductors 154a and 154b, and the passivation layer and the gate insulating layer have a plurality of contact holes 181, 182a, 182b, 185a, and 185b. A plurality of pixel electrodes 191 including first and second sub-pixel electrodes 191a and 191b and a plurality of contact assistants 81, 82a, and 82b are formed on the passivation layer. An alignment layer (not shown) is formed on the pixel electrodes 191, the contact assistants 81, 82a, and 82b, and the passivation layer.

Regarding the upper panel a light blocking member, a common electrode 270, and an alignment layer are formed on an insulating substrate.

However, the shape of the pixel electrode 191 of the LC panel assembly according to the present exemplary embodiment is different from that of the LC panel assembly illustrated in FIG. 4 to FIG. 6.

Each of the first and the second sub-pixel electrode 191a and 191b includes a pair of first edges 191a1 and 191b1 that are substantially parallel to the gate line 121 and a pair of second edges 191a2 and 191b2 that are substantially parallel to the data lines 171a and 171b. In other words, each of the first and the second sub-pixel electrode 191a and 191b has a substantially quadrangular shape.

The height of the first sub-pixel electrode 191a is less than that of the second sub-pixel electrode 191b, and the width of the first sub-pixel electrode 191a is a little less than that of the second sub-pixel electrode 191b. The height and the width of the first and second sub-pixel electrodes 191a and 191b may be adjusted to obtain a desired area ratio. Also, the first and second sub-pixel electrodes 191a and 191b are adjacent to each other in the column direction.

In the LC panel assembly in FIG. 12, the LC layer 3 has positive dielectric anisotropy, and the LC molecules in the LC layer 3 are aligned such that their major axes are substantially parallel to the two panels in the absence of an electric field. When an electric field is generated between the pixel electrode 191 and the common electrode 270 that are applied with voltages, the LC molecules in the LC layer 3 are aligned parallel to the electric field.

Numerous characteristics of the LC panel assembly illustrated in FIG. 4 to FIG. 6 may be also applied to the LC panel assembly illustrated in FIG. 12.

Next, another example of the LC panel assembly illustrated in FIG. 3 will be described in detail with reference to FIG. 13 and FIG. 14.

Figure 13:
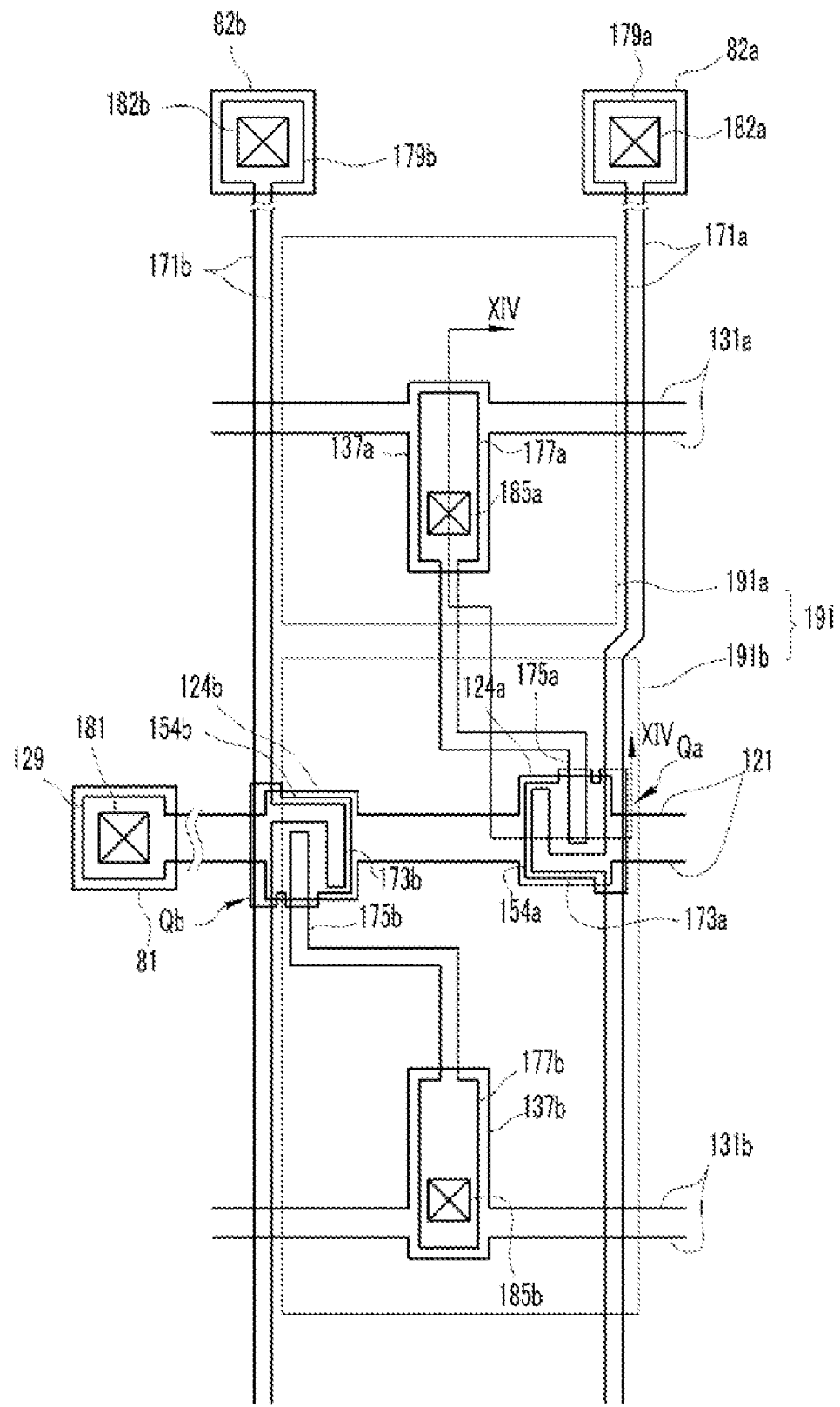
FIG. 13 is a layout view of an LC panel assembly according to an exemplary embodiment of the present invention.
Figure 14:
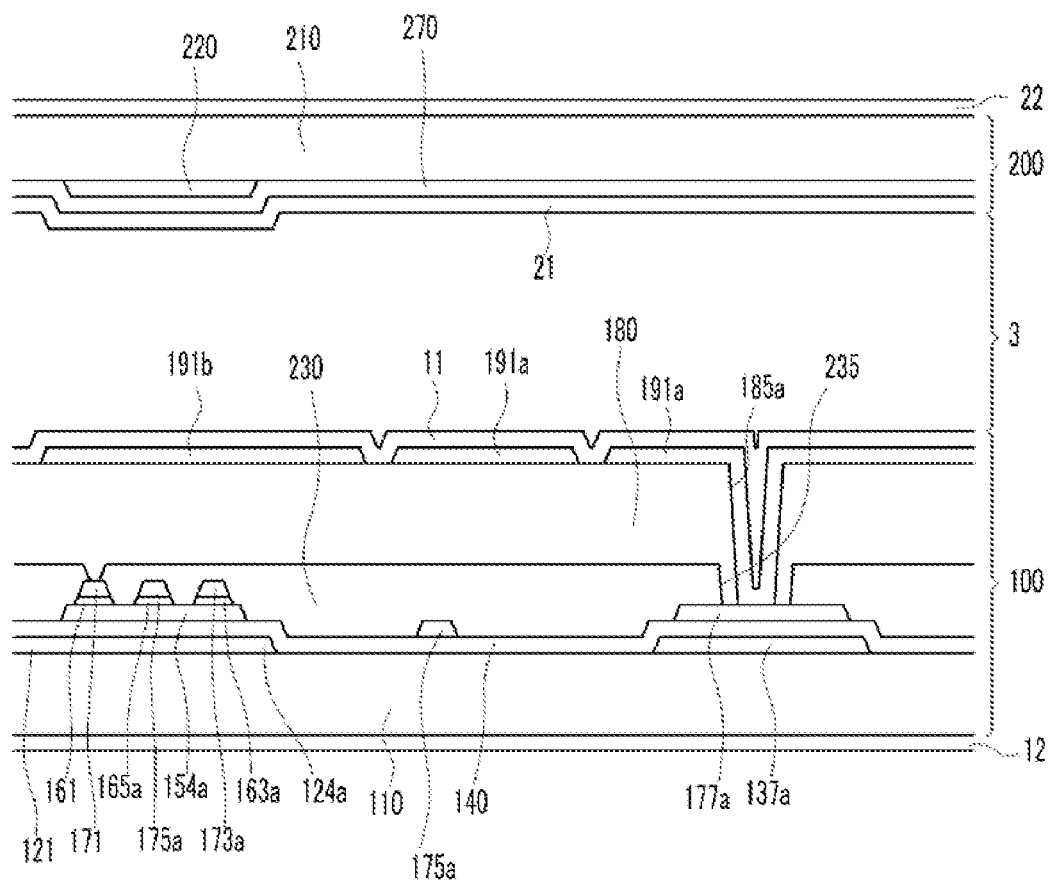

FIG. 13 is a layout view of an LC panel assembly according to an exemplary embodiment of the present invention, and FIG. 14 is a cross-sectional view of the LC panel assembly illustrated in FIG. 13 taken along line XIV-XIV.

Referring to FIGS. 13 and 14, the LC panel assembly includes a lower panel 100, an upper panel 200, and an LC layer 3 interposed therebetween.

The layered structure of the LC panel assembly according to the present exemplary embodiment is similar to the layered structure of the LC panel assembly illustrated in FIG. 4 to FIG. 6.

Regarding the lower panel 100, a plurality of gate conductors including a plurality of gate lines 121 and a plurality of pairs of storage electrode lines 131a and 131b are formed on an insulating substrate 110. Each of the gate lines 121 includes first and second gate electrodes 124a and 124b and an end portion 129. A gate insulating layer 140 is formed on the gate conductors 121, 131a, and 131b. A plurality of semiconductors 154a and 154b are formed on the gate insulating layer 140, and a plurality of ohmic contacts 163a and 165a are formed thereon. Data conductors including a plurality of data lines 171a and 171b and a plurality of first and second drain electrodes 175a and 175b are formed on the ohmic contacts. Each of the data lines 171a and 171b includes a plurality of first and second source electrodes 173a and 173b and an end portion 179a and 179b, and the drain electrodes 175a and 175b include end portions 177a and 177b having a large area. The shape of the data line 171a and 171b is the same as that of the data lines 171a and 171b of the LC panel assembly illustrated in FIG. 11. A passivation layer 180 is formed on the data conductors 171 a, 171b, 175a, and 175b and exposed portions of the semiconductors 154a and 154b, and the passivation layer 180 and the gate insulating layer 140 have a plurality of contact holes 181, 182a, 182b, 185a, and 185b. A plurality of pixel electrodes 191 including first and second sub-pixel electrodes 191a and 191b and a plurality of contact assistants 81, 82a, and 82b are formed on the passivation layer 180. The shape of the pixel electrode 191 in the LC panel assembly according to the present exemplary embodiment is the same as that of the pixel electrode 191 in the LC panel assembly illustrated in FIG. 12. An alignment layer 11 is formed on the pixel electrodes 191, the contact assistants 81, 82a, and 82b, and the passivation layer 180.

Regarding the upper panel 200, a light blocking member 220, a common electrode 270, and an alignment layer 21 are formed on an insulating substrate 210.

However, in the LC panel assembly according to the present exemplary embodiment, unlike the LC panel assembly illustrated in FIG. 4 to FIG. 6, there is no color filter on the upper panel 200, and instead, a plurality of color filters 230 are formed under the passivation layer 180 in the lower panel 100.

The color filters 230 are periodically curved along the column of the pixel electrodes 191 and extend in the longitudinal direction, and they do not exist in peripheral regions where the end portions 129 of the gate lines 121 and the end portions 179 of the data lines 171 are disposed. A contact hole 185a passes through a color filter 230 and a penetrating hole 235 that is bigger than the contact hole 185a is formed in the color filter 230.

Adjacent color filters 230 may overlap each other on the data line 171 to function as a light blocking member that blocks light leakage between adjacent pixel electrodes 191. In this case, the light blocking member on the upper panel 200 may be omitted.

A passivation layer (not shown) may be also provided under the color filters 230.

Also, the semiconductors 154a and 154b in the LC panel assembly according to the present exemplary embodiment are extended along the data lines 171a and 171b to form semiconductor stripes (not shown), and the ohmic contacts 163a and 165a are extended along the data lines 171a and 171b to form ohmic contact stripes 161.

Numerous characteristics of the LC panel assembly illustrated in FIG. 4 to FIG. 6 may be also applied to the LC panel assembly illustrated in FIG. 13 and FIG. 14.

Next, another example of the LC panel assembly illustrated in FIG. 3 will be described in detail with reference to FIG. 15.

Figure 15:
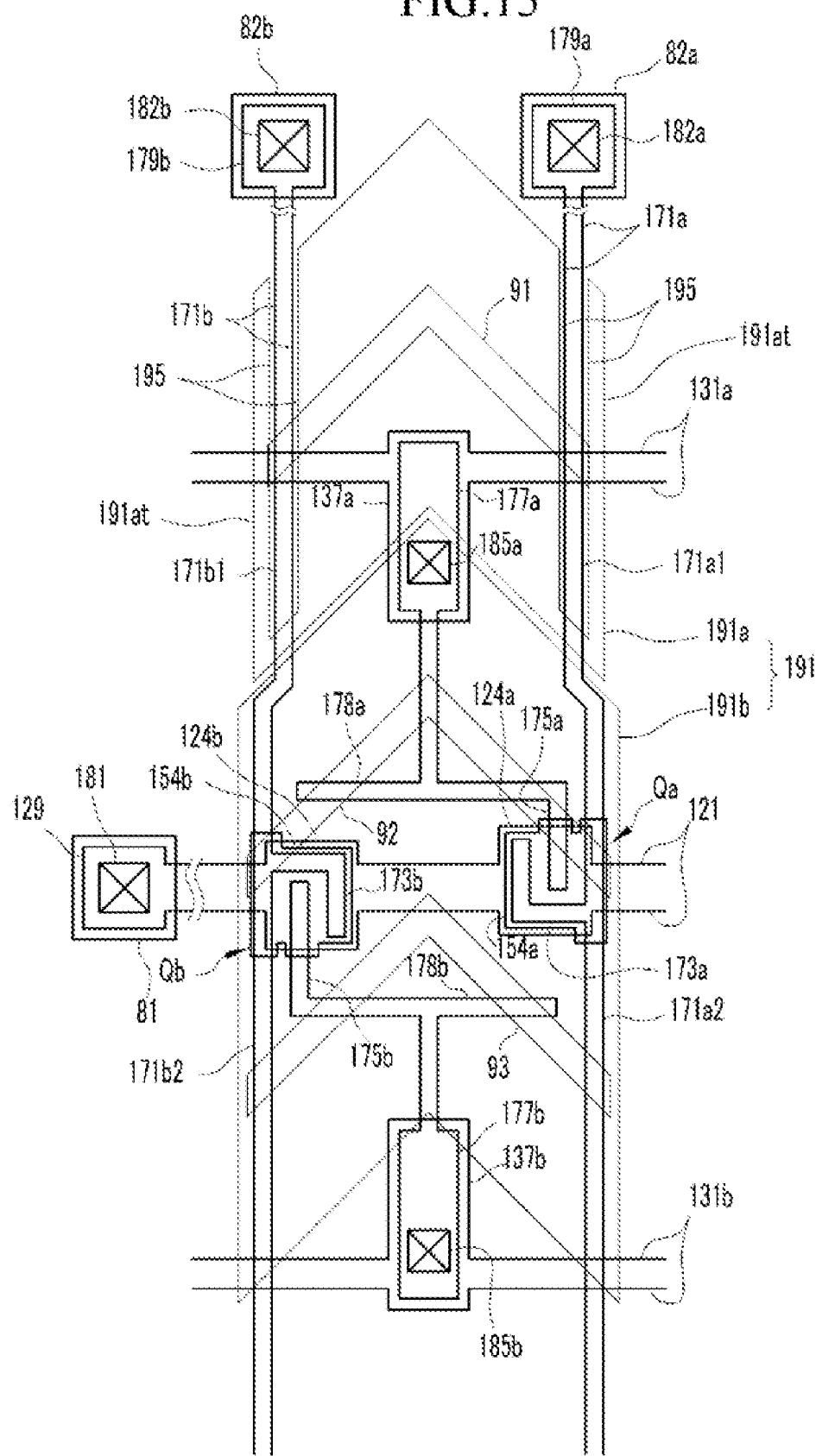
FIG. 15 is a layout view of an LC panel assembly according to an exemplary embodiment of the present invention.

FIG. 15 is a layout view of an LC panel assembly according to an exemplary embodiment of the present invention.

Referring to FIG. 15, the LC panel assembly includes a lower panel (not shown) and an upper panel (not shown) and an LC layer (not shown) interposed therebetween.

The layered structure of the LC panel assembly according to the present exemplary embodiment is similar to the layered structure of the LC panel assembly illustrated in FIG. 4 to FIG. 6.

Regarding the lower panel, a plurality of gate conductors including a plurality of gate lines 121 and a plurality of pairs of storage electrode lines 131a and 131b are formed on an insulating substrate (not shown). Each of the gate lines 121 includes first and second gate electrodes 124a and 124b and an end portion 129. A gate insulating layer (not shown) is formed on the gate conductors 121, 131 a, and 131b. A plurality of semiconductors 154a and 154b are formed on the gate insulating layer, and a plurality of ohmic contacts (not shown) is formed thereon. Data conductors including a plurality of data lines 171a and 171b and a plurality of first and second drain electrodes 175a and 175b are formed on the ohmic contacts. Each of the data lines 171a and 171b includes a plurality of first and second source electrodes 173a and 173b and an end portion 179a and 179b, and the drain electrodes 175a and 175b include end portions 177a and 177b having a large area. A passivation layer (not shown) is formed on the data conductors 171a, 171b, 175a, and 175b and exposed portions of the semiconductors 154a and 154b, and the passivation layer and the gate insulating layer have a plurality of contact holes 181, 182a, 182b, 185a, and 185b. A plurality of pixel electrodes 191 including first and second sub-pixel electrodes 191a and 191b and a plurality of contact assistants 81, 82a, and 82b are formed on the passivation layer. An alignment layer (not shown) is formed on the pixel electrodes 191, the contact assistants 81, 82a, and 82b, and the passivation layer.

Regarding the upper panel, a light blocking member, a common electrode, and an alignment layer are formed on an insulating substrate.

However, in the LC panel assembly according to the present exemplary embodiment, auxiliary electrodes 191at are formed on both sides of the first sub-pixel electrode 191a. A pair of data lines 171a and 171b extend along gaps 195 between the auxiliary electrode 191at and the first sub-pixel electrode 191a, so the first sub-pixel electrode 191a and a pair of data lines 171a and 171b do not overlap each other.

Accordingly, even when the first sub-pixel electrode 191a shifts to the left or right, there is no difference between the parasitic capacitances generated between a pair of data lines 171a and 171b and the first sub-pixel electrode 191a. Therefore, there is no need to accurately adjust the distances between the first sub-pixel electrode 191a and a pair of data lines 171a and 171b.

Next, an LC panel assembly according to an exemplary embodiment of the present invention will be described in detail with reference to FIG. 16 to FIG. 20 along with FIG. 1 and FIG. 2 described above.

Figure 16:
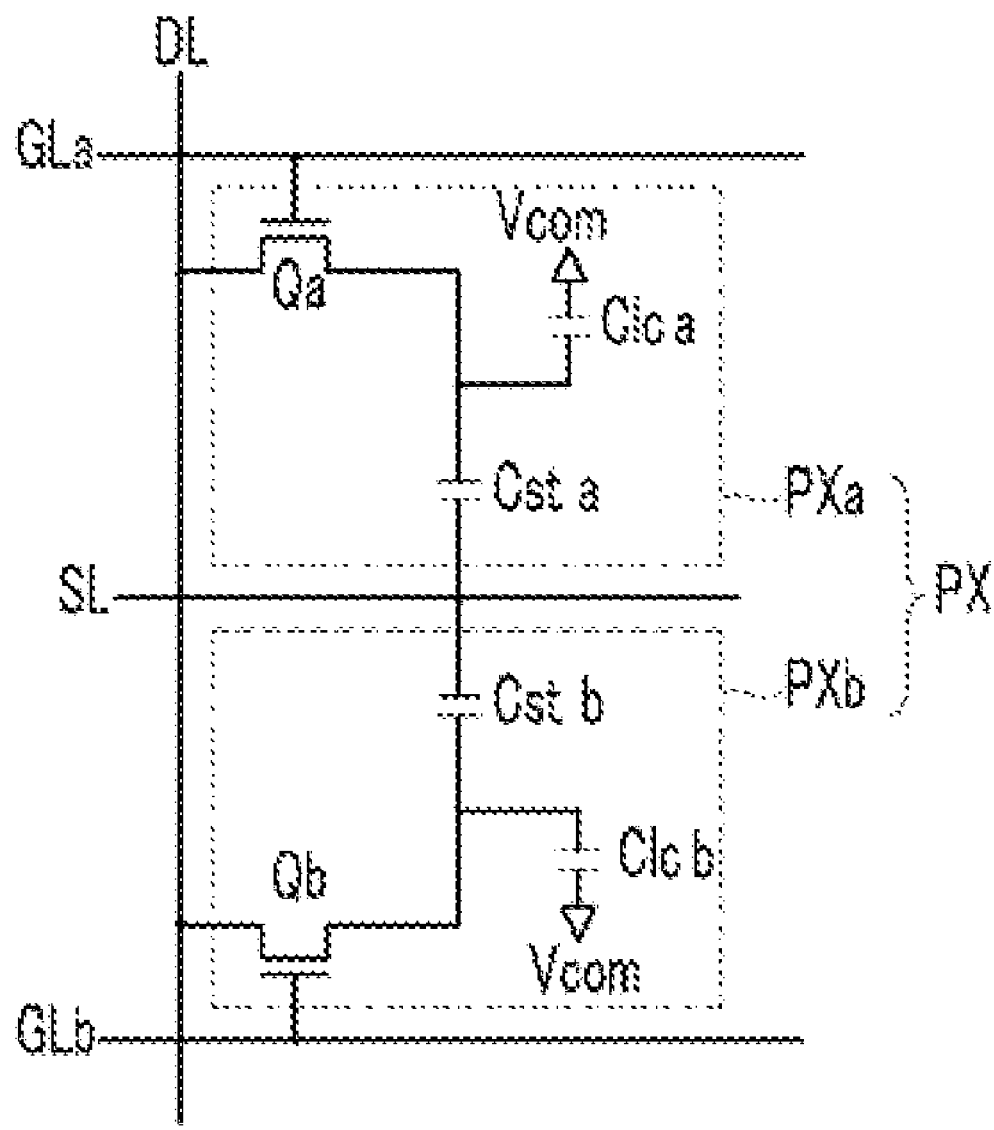
FIG. 16 is an equivalent circuit diagram of a pixel of an LC panel assembly according to an exemplary embodiment of the present invention.

FIG. 16 is an equivalent circuit diagram of a pixel of an LC panel assembly according to an exemplary embodiment of the present invention.

Referring to FIG. 16, an LC panel assembly includes signal lines including a plurality of pairs of gate lines GLa and GLb, a plurality of data lines DL, and a plurality of storage electrode lines SL, and a plurality of pixels PX connected to the signal lines.

Each pixel PX includes a pair of sub-pixels PXa and PXb, and each sub-pixel PXa/PXb includes a switching element Qa/Qb that is respectively connected to a corresponding gate line GLa/GLb and a data line DL, an LC capacitor Clca/Clcb that is connected to the switching element Qa/Qb, and a storage capacitor Csta/Cstb that is connected to the switching element Qa/Qb and the storage electrode line SLa/SLb.

Each switching element Qa/Qb including a TFT is also a three-terminal element provided on the lower panel 100, and it has a control terminal connected to a gate line GLa/GLb, an input terminal connected to a data line DL, and an output terminal connected to an LC capacitor Clca/Clcb and a storage capacitor Csta/Cstb.

The LC capacitors Clca and Clcb, the storage capacitors Csta and Cstb, and the operation of an LCD including the above LC panel assembly are substantially the same as those of FIG. 3, so detailed descriptions thereof will be omitted. However, in the LC panel assembly illustrated in FIG. 3, two sub-pixels PXa and PXb forming a pixel PX are applied with data voltages at the same time, but in the present exemplary embodiment, the two sub-pixels PXa and PXb are applied with data voltages at a different time.

Now, an example of the LC panel assembly illustrated in FIG. 16 will be described in detail with reference to FIG. 17.

Figure 17:
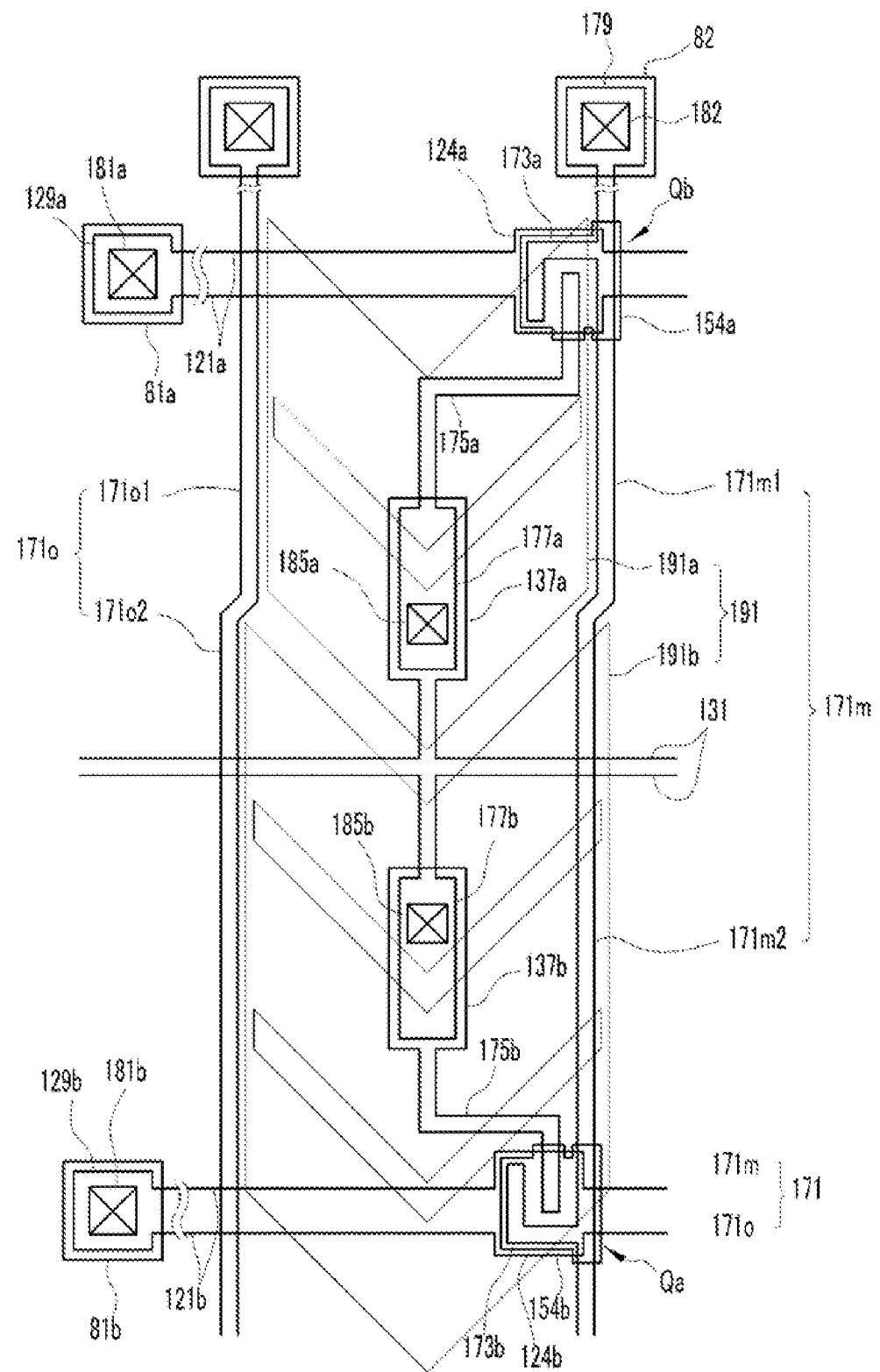
FIG. 17 is a layout view of an LC panel assembly according to an exemplary embodiment of the present invention.

FIG. 17 is a layout view of an LC panel assembly according to an exemplary embodiment of the present invention.

Referring to FIG. 17, the LC panel assembly includes a lower panel (not shown) and an upper panel (not shown) opposing each other and an LC layer (not shown) interposed between the two panels.

The layered structure of the LC panel assembly according to the present exemplary embodiment is similar to the layered structure of the LC panel assembly illustrated in FIG. 4 to FIG. 6.

Regarding the lower panel, a plurality of gate conductors including a plurality of pairs of gate lines 121a and 121b and a plurality of storage electrode lines 131 are formed on an insulating substrate (not shown). The gate lines 121a and 121b include first and second gate electrodes 124a and 124b and end portions 129a and 129b, respectively. A gate insulating layer (not shown) is formed on the gate conductors 121a, 121b, and 131. A plurality of semiconductors 154a and 154b are formed on the gate insulating layer, and a plurality of ohmic contacts (not shown) are formed thereon. Data conductors including a plurality of data lines 171 and a plurality of first and second drain electrodes 175a and 175b are formed on the ohmic contacts. Each data line 171 includes a plurality of first and second source electrodes 173a and 173b and an end portion 179, and the drain electrodes 175a and 175b respectively include end portions 177a and 177b having a large area. A passivation layer (not shown) is formed on the data conductors 171, 175a, and 175b and exposed portions of the semiconductors 154a and 154b, and the passivation layer and the gate insulating layer have a plurality of contact holes 181 a, 181b, 182, 185a, and 185b. A plurality of pixel electrodes 191 including first and second sub-pixel electrodes 191a and 191b and a plurality of contact assistants 81a, 81b, and 82 are formed on the passivation layer. An alignment layer (not shown) is formed on the pixel electrodes 191, the contact assistants 81a, 81b, and 82, and the passivation layer.

Regarding the upper panel, a light blocking member, a common electrode, and an alignment layer are formed on an insulating substrate.

However in the LC panel assembly according to the present exemplary embodiment, the number of gate lines 121a and 121b is twice and the number of data lines 171 is half compared to the LC panel assembly illustrated in FIG. 4 to FIG. 6. Here a pair of gate lines 121a and 121b is repeatedly disposed in the same manner.

In addition, the first and second TFTs Qa and Qb connected to the first and second sub-pixel electrodes 191a and 191b forming a pixel electrode 191 are connected to the same data line 171 and different gate lines 121a and 121b.

The first and second TFTs Qa and Qb are located on the left side of the data line 171, respectively.

The data lines 171 of the LC panel assembly illustrated in FIG. 17 are the same as the data lines 171a and 171b of the LC panel assembly illustrated in FIG. 4. The data lines 171 includes a data line 171m (referred to as a "self data line") connected to the first and second sub-pixel electrodes 191a and 191b via the TFTs Qa and Qb, and a data line 171o (referred to as an "adjacent data line") not connected to the first and second sub-pixel electrodes 191a and 191b but connected to the adjacent pixel electrode 191. The self data line 171m includes a first portion 171m1 not overlapping the first sub-pixel electrode 191a and a second portion 171m2 overlapping the second sub-pixel electrode 191b. The adjacent data line 171o includes a first portion 171o1 and a second portion 171o2 that are curved to each other, and neither of these portions 171o1 and 171o2 overlap the first and second sub-pixel electrodes 191a and 191b.

Numerous characteristics of the LC panel assembly illustrated in FIG. 4 to FIG. 6 may also be applied to the LC panel assembly illustrated in FIG. 17.

Now, other examples of the LC panel assembly illustrated in FIG. 16 will be described in detail with reference to FIG. 18 to FIG. 20.

Figure 18:
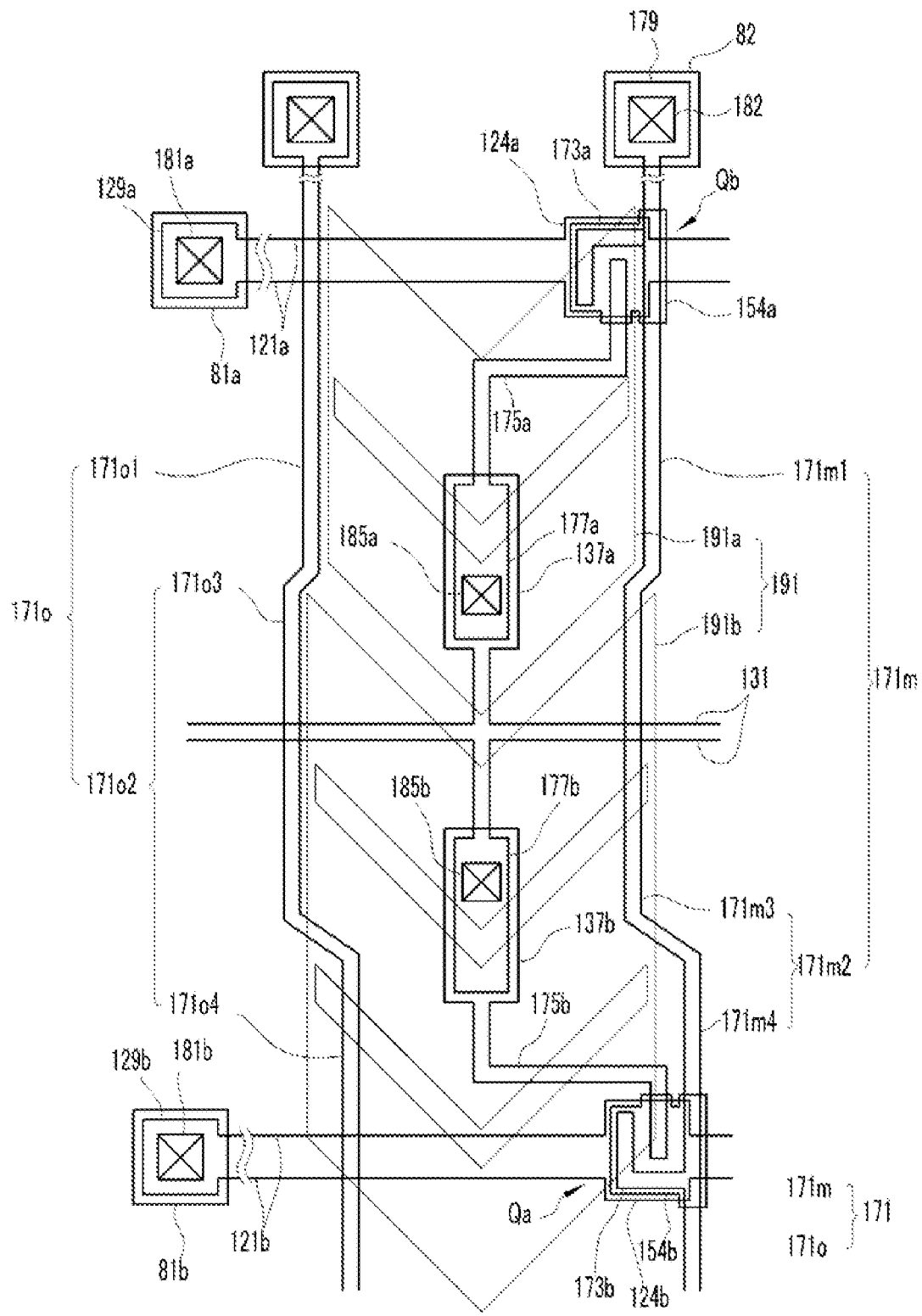
FIG. 18 is a layout view of an LC panel assembly according to an exemplary embodiment of the present invention.

FIG. 18 is a layout view of an LC panel assembly according to an exemplary embodiment of the present invention. FIG. 19 is a layout view of an LC panel assembly according to an exemplary embodiment of the present invention, and FIG. 20 is a layout view of an LC panel assembly according to an exemplary embodiment of the present invention.

Figure 19:
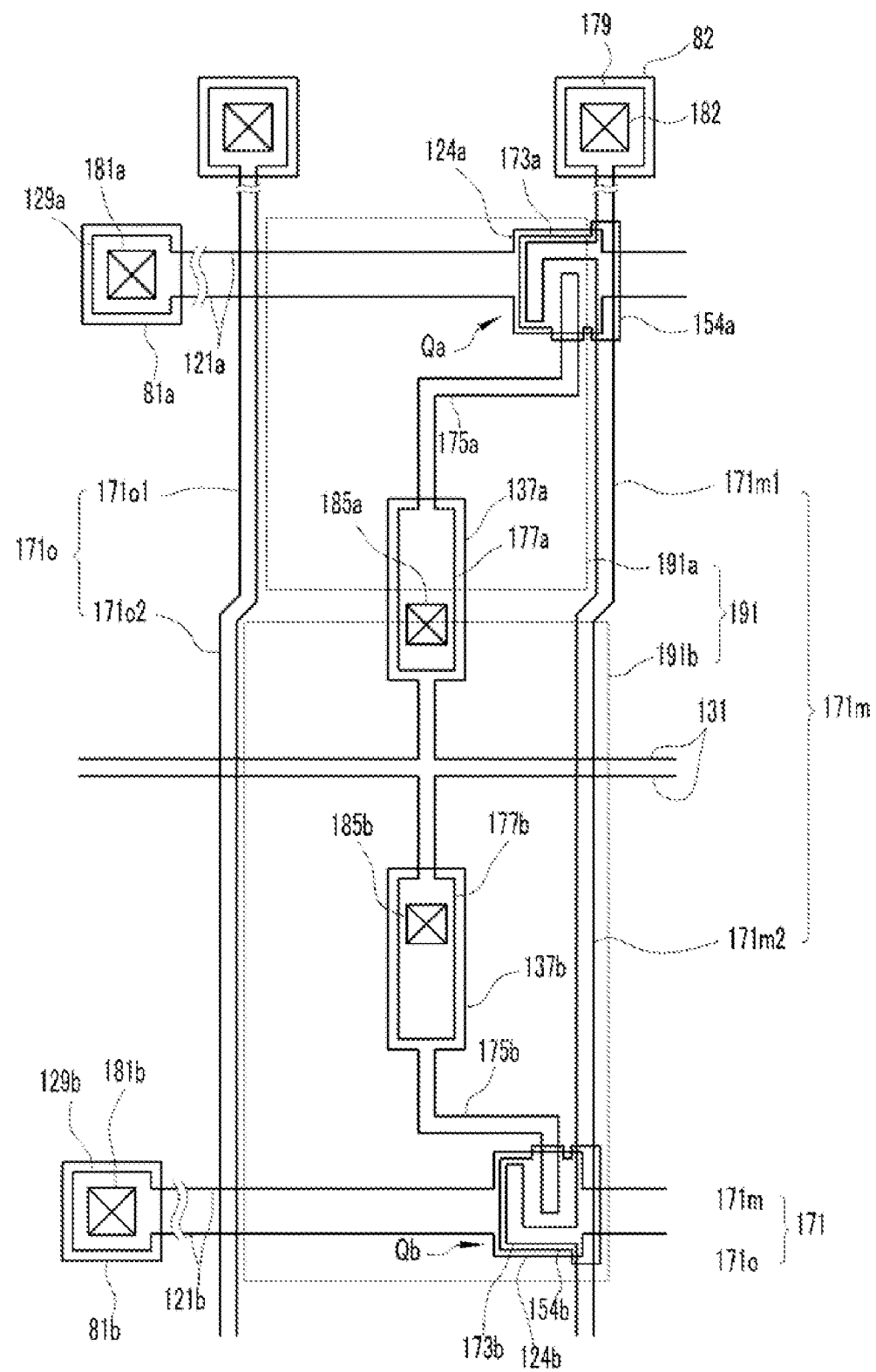
FIG. 19 is a layout view of an LC panel assembly according to an exemplary embodiment of the present invention.
Figure 20:
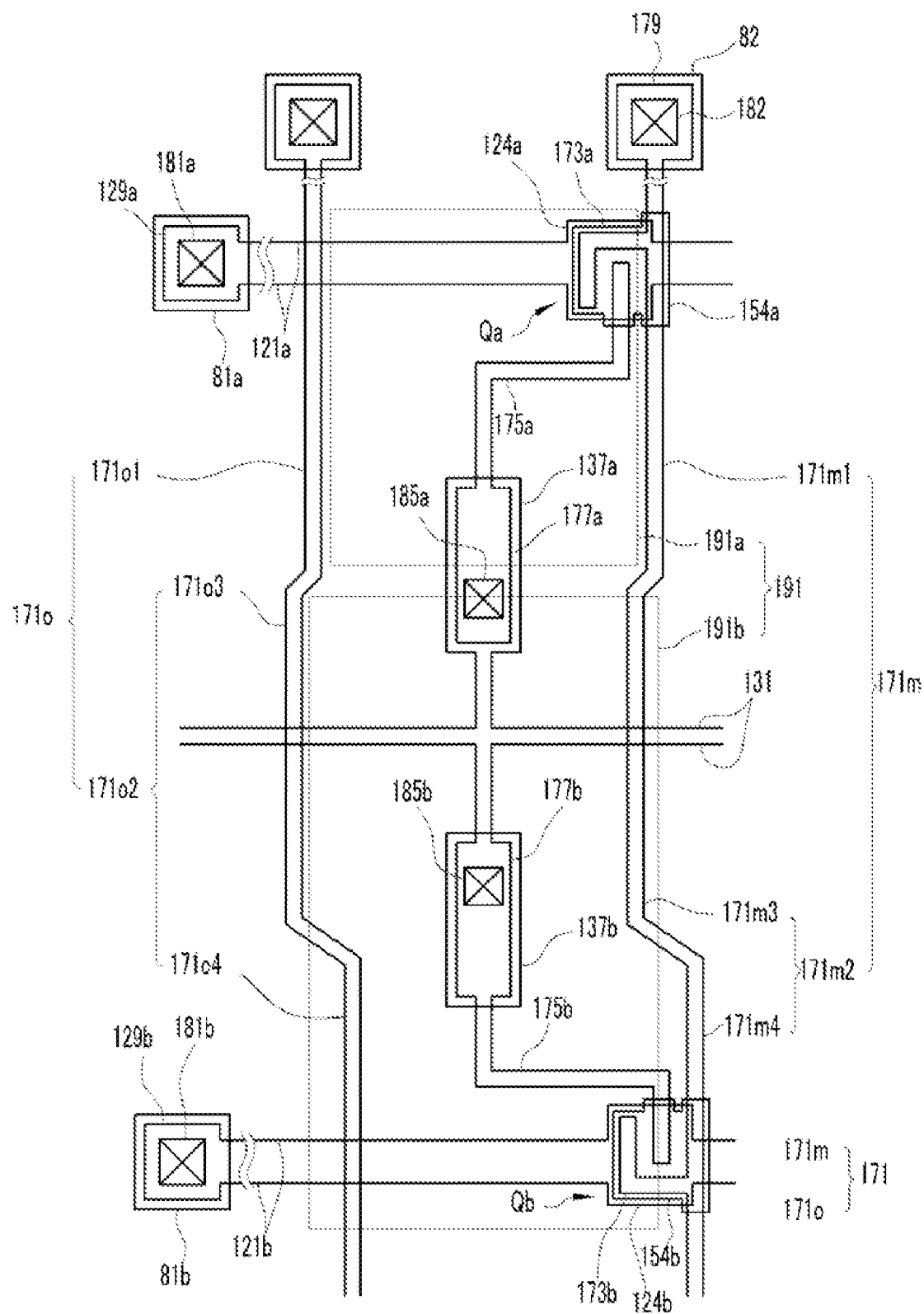
FIG. 20 is a layout view of an LC panel assembly according to an exemplary embodiment of the present invention.

Referring to FIG. 18, FIG. 19, and FIG. 20, respectively, the LC panel assembly includes a lower panel (not shown) and an upper panel (not shown) opposing each other and an LC layer (not shown) interposed between the two panels.

The layered structure of the LC panel assembly according to the present exemplary embodiments is similar to the layered structure of the LC panel assembly illustrated in FIG. 4 to FIG. 6.

Regarding the lower panel, a plurality of gate conductors including a plurality of pairs of gate lines 121a and 121b and a plurality of storage electrode lines 131 are formed on an insulating substrate (not shown). The gate lines 121a and 121b include first and second gate electrodes 124a and 124b and end portions 129a and 129b, respectively. A gate insulating layer (not shown) is formed on the gate conductors 121a, 121b, and 131. A plurality of semiconductors 154a and 154b are formed on the gate insulating layer, and a plurality of ohmic contacts (not shown) is formed thereon. Data conductors including a plurality of data lines 171 and a plurality of first and second drain electrodes 175a and 175b are formed on the ohmic contacts. Each data line 171 includes a plurality of first and second source electrodes 173a and 173b and an end portion 179, and the drain electrodes 175a and 175b respectively include end portions 177a and 177b having a large area. A passivation layer (not shown) is formed on the data conductors 171, 175a, and 175b and exposed portions of the semiconductors 154a and 154b, and the passivation layer and the gate insulating layer have a plurality of contact holes 181a, 181b, 182, 185a, and 185b. A plurality of pixel electrodes 191 including first and second sub-pixel electrodes 191a and 191b and a plurality of contact assistants 81a, 81b, and 82 are formed on the passivation layer. An alignment layer (not shown) is formed on the pixel electrodes 191, the contact assistants 81a, 81b, and 82, and the passivation layer.

Regarding the upper panel a light blocking member, a common electrode, and an alignment layer are formed on an insulating substrate.

However, in the LC panel assembly illustrated in FIG. 18, unlike the LC panel assembly of FIG. 17, the self data line 171m is curved twice where it is adjacent to a pixel electrode 191. In other words, the self data line 171m includes a first portion 171m1 that is adjacent to but does not overlap the first sub-pixel electrode 191a and a second portion 171m2 that is adjacent to the second sub-pixel electrode 191b. The second portion 171m2 includes a third portion 171m3 overlapping the second sub-pixel electrode 191b and a fourth portion 171m4 not overlapping the second sub-pixel electrode 191b.

The adjacent data line 171o is also curved twice where it is adjacent to a pixel electrode 191. In other words, the adjacent data line 171o includes a first portion 171o1 that is adjacent to but does not overlap the first sub-pixel electrode 191a and a second portion 171o2 that is adjacent to the second sub-pixel electrode 191b. The second portion 171o2 also includes a third portion 171o3 and a fourth portion 171o4 that are curved to each other. The fourth portion 171o4 overlaps the second sub-pixel electrode 191b.

In this way, data lines 171 are curved twice through a pixel electrode 191, thereby minimizing occurrence of vertical cross-talk.

In the LC panel assembly illustrated in FIG. 19, unlike the LC panel assembly of FIG. 17, the shape of the pixel electrode 191 is the same as that of the pixel electrode 191 in the LC panel assembly of FIG. 12. The shape of the data lines 171 is the same as that of the data lines 171 in the LC panel assembly illustrated in FIG. 17.

In the LC panel assembly illustrated in FIG. 20, the shape of the data lines 171 is the same as that of the data lines 171 in the LC panel assembly of FIG. 18, and the shape of the pixel electrode 191 is the same as that of the pixel electrode 191 in the LC panel assembly of FIG. 12.

Numerous characteristics of the LC panel assembly illustrated in FIG. 4 to FIG. 6 may be also applied to the LC panel assembly illustrated in FIG. 18 to FIG. 20.

Now, an LCD according to an exemplary embodiment of the present invention will be described in detail with reference to FIG. 21 and FIG. 22.

Figure 21:
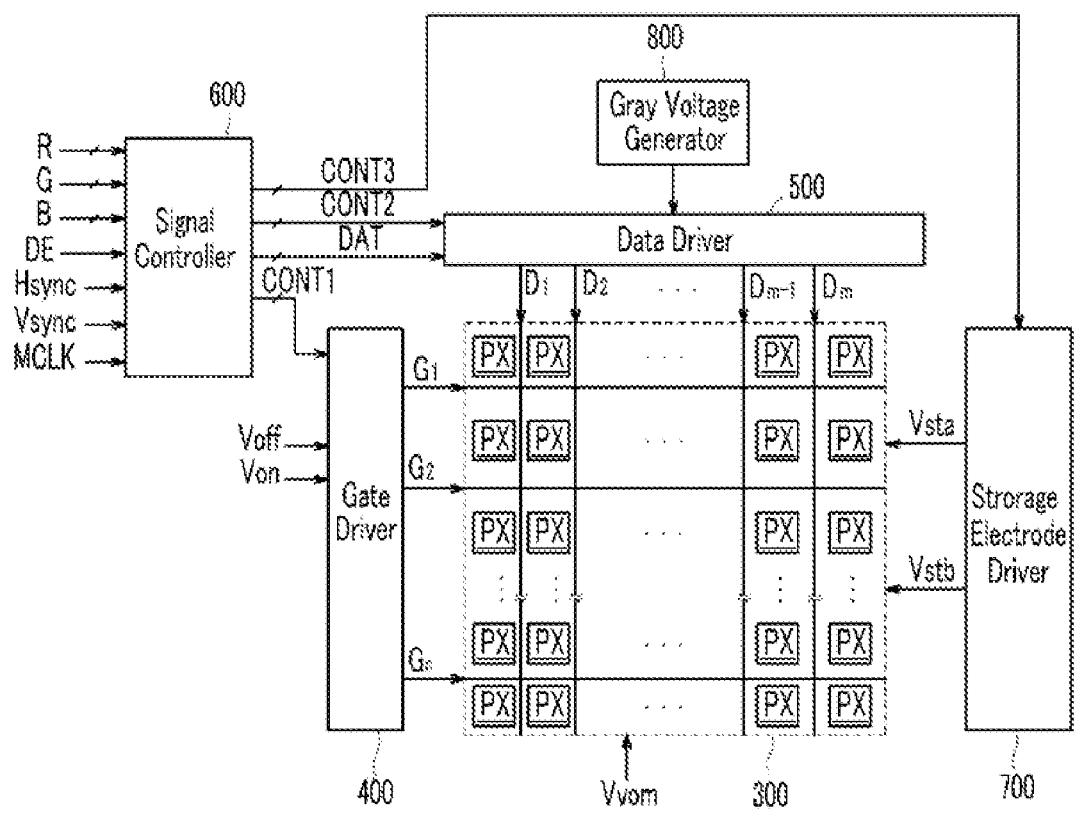
FIG. 21 is a block diagram of an LCD according to an exemplary embodiment of the present invention.
Figure 22:
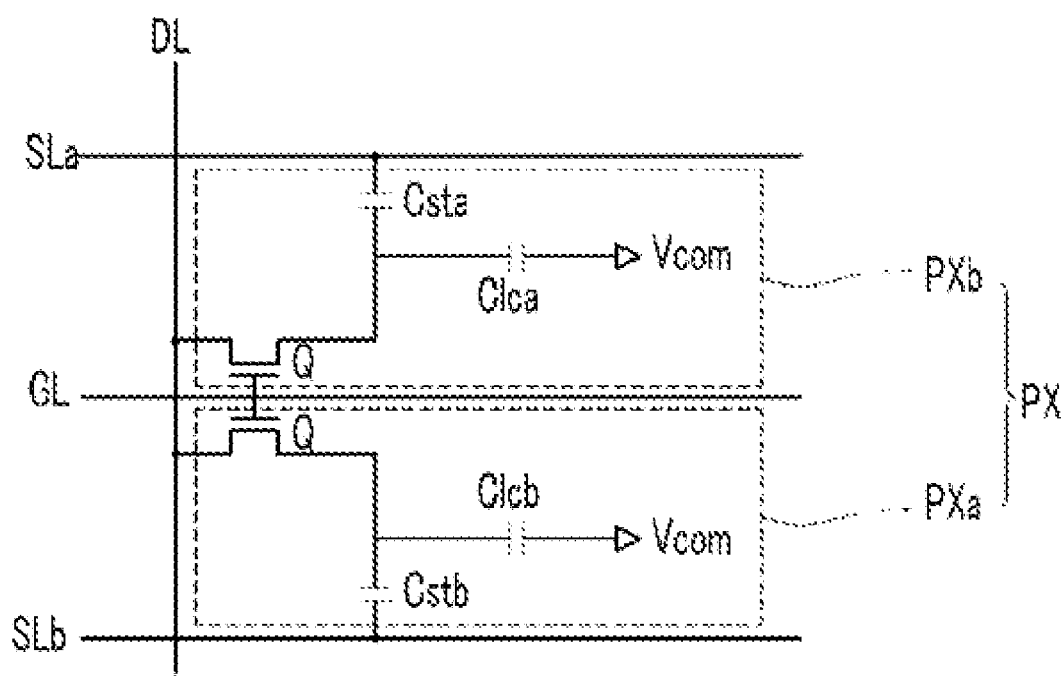
FIG. 22 is an equivalent circuit diagram of a pixel of an LC panel assembly according to an exemplary embodiment of the present invention.

FIG. 21 is a block diagram of an LCD according to an exemplary embodiment of the present invention, and FIG. 22 is an equivalent circuit diagram of a pixel of an LC panel assembly according to an exemplary embodiment of the present invention.

Referring to FIG. 21 and FIG. 22, the LCD includes an LC panel assembly 300, a gate driver 400, a data driver 500, and a storage electrode driver 700 that are connected to the LC panel assembly 300, a gray voltage generator 800 connected to the data driver 500, and a signal controller 600 controlling the gate driver 400, the data driver 500 and the storage electrode driver 700.

The LC panel assembly 300 includes a plurality of signal lines $G_1$-$G_n$ and $D_1$-$D_m$, and a plurality of pixels PX connected thereto and arranged approximately in a matrix. The LC panel assembly 300 includes lower and upper panels 100 and 200 opposing each other and an LC layer 3 interposed therebetween, as shown in FIG. 2.

The signal lines $G_1$-$G_n$ and $D_1$-$D_m$ include a plurality of gate lines $G_1$-$G_n$ for transmitting gate signals (also referred to as "scanning signals"), a plurality of data lines $D_1$-$D_m$ for transmitting data signals, and a plurality of pairs of first and second storage electrode lines SLa and SLb for transmitting storage electrode signals. The gate lines $G_1$-$G_n$ extend substantially in the row direction and are substantially parallel to each other, and the data lines $D_1$-$D_m$ extend substantially in the column direction and are substantially parallel to each other.

The LC panel assembly 300 includes signal lines including a plurality of gate lines GL, a plurality of data lines DL, and a plurality of pairs of storage electrode lines SLa and SLb and a plurality of pixels PX connected to the signal lines.

Each pixel PX includes a pair of sub-pixels PXa and PXb, and each sub-pixel PXa/PXb includes a switching element Q that is connected to a corresponding gate line GL and data line DL, a first/second LC capacitor Clca/Clcb connected to the switching element Q and a first/second storage capacitor Csta/Cstb connected to the switching element Q and the storage electrode line SLa/SLb, respectively.

The switching element Q including a TFT is also a three-terminal element provided on the lower panel 100, and it has a control terminal connected to a gate line GL, an input terminal connected to a data line DL, and an output terminal connected to an LC capacitor Clca/Clcb and a storage capacitor Csta/Cstb.

The first LC capacitor Clca includes a first sub-pixel electrode 191a provided on a lower panel 100 and a common electrode 270 provided on an upper panel 200 as its two terminals, and the second LC capacitor Clcb includes a second sub-pixel electrode 191b provided on the lower panel 100 and the common electrode 270 provided on the upper panel 200 as its two terminals. An LC layer 3 disposed between the electrodes 191 and 270 functions as a dielectric of the LC capacitors Clca and Clcb. The first and second sub-pixel electrodes 191a and 191b are connected to the TFT Q in common. The common electrode 270 is formed on the entire surface of the upper panel 200 and is supplied with a common voltage Vcom.

The first storage capacitor Csta is formed by overlapping a first storage electrode line SLa provided on the lower panel 100 with a first sub-pixel electrode 191a via an insulator disposed therebetween, and the second storage capacitor Cstb is formed by overlapping a second storage electrode line SLb provided on the lower panel 100 with a second sub-pixel electrode 191b via an insulator disposed therebetween. The first and second storage electrode lines SLa and SLb are supplied with storage electrode signals Vsta and Vstb.

Now, this LC panel assembly 300 will be described in detail with reference to FIG. 23.

Figure 23:
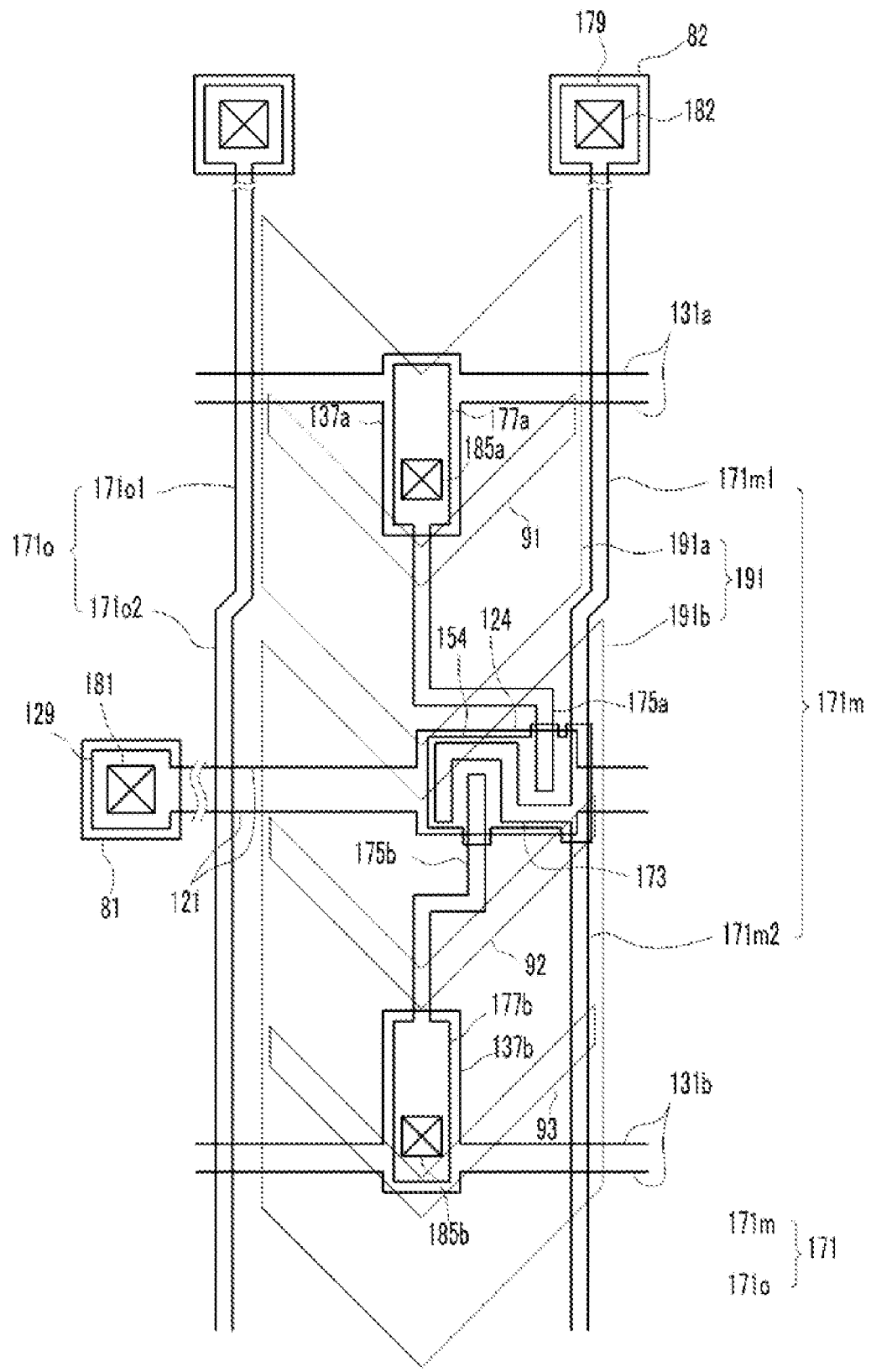
FIG. 23 is a layout view of an LC panel assembly according to an exemplary embodiment of the present invention.

Referring to FIG. 23, the LC panel assembly according to an exemplary embodiment of the present invention also includes a lower panel (not shown) and an upper panel (not shown) opposing each other and an LC layer (not shown) interposed between the two panels.

The layered structure of the LC panel assembly according to the present exemplary embodiment is similar to the layered structure of the LC panel assembly illustrated in FIG. 4 to FIG. 6.

Regarding the lower panel, a plurality of gate conductors including a plurality of gate lines 121 and a plurality of pairs of storage electrode lines 131a and 131b are formed on an insulating substrate (not shown). Each gate line 121 includes gate electrodes 124 and an end portion 129. A gate insulating layer (not shown) is formed on the gate conductors 121, 131a and 131b. A plurality of semiconductors 154 are formed on the gate insulating layer, and a plurality of ohmic contacts (not shown) are formed thereon. Data conductors including a plurality of data lines 171 and a plurality of first and second drain electrodes 175a and 175b are formed on the ohmic contacts. Each data line 171 includes a plurality of source electrodes 173 and an end portion 179, and the drain electrodes 175a and 175b include end portions 177a and 177b having a large area. A passivation layer (not shown) is formed on the data conductors 171, 175a, and 175b and exposed portions of the semiconductors 154, and the passivation layer and the gate insulating layer have a plurality of contact holes 181, 182, 185a, and 185b. A plurality of pixel electrodes 191 including first and second sub-pixel electrodes 191a and 191b and a plurality of contact assistants 81 and 82 are formed on the passivation layer. An alignment layer (not shown) is formed on the pixel electrodes 191, the contact assistants 81 and 82, and the passivation layer.

Regarding the upper panel, a light blocking member, a common electrode, and an alignment layer are formed on an insulating substrate.

The LCD according to the present exemplary embodiment, unlike the LCD illustrated in FIG. 4 and FIG. 16, includes a gate line 121 and a data line 171 for each pixel, and a gate electrode 124, a source electrode 173, and a first drain electrode 175a, along with a projection 154 of a semiconductor stripe, form a portion of a TFT Q having a channel formed in the projection 154 disposed 2.7) between the source electrode 173 and the first drain electrode 175a. Also, a gate electrode 124, a source electrode 173, and a second drain electrode 175b, along with a projection 154 of a semiconductor stripe, form a portion of a TFT Q having a channel formed in the projection 154 disposed between the source electrode 173 and the second drain electrode 175b.

Referring to FIG. 21 again, the gray voltage generator 800 generates two sets of a plurality of gray voltages (or reference gray voltages) related to the transmittance of the pixels PX. The gray voltages in one set have positive polarity with respect to the common voltage Vcom, while those in the other set have negative polarity with respect to the common voltage Vcom.

The gate driver 400 is connected to the gate lines $G_1$-$G_n$ of the LC panel assembly 300 and synthesizes a gate-on voltage Von and a gate-off voltage Voff to generate gate signals, which are applied to the gate lines $G_1$-$G_n$.

The data driver 500 is connected to the data lines $D_1$-$D_m$ of the LC panel assembly 300 and selects gray voltages supplied from the gray voltage generator 800 and then applies the selected gray voltages to the data lines $D_1$-$D_m$ as data signals. However, in the case when the gray voltage generator 800 supplies only reference gray voltages of a predetermined number instead of supplying voltages for all grays, the data driver 500 divides the reference gray voltages to generate gray voltages for all grays, from which data signals are selected.

The storage electrode driver 700 is connected to the first and second storage electrode lines SLa and SLb, and applies a pair of storage electrode signals Vsta and Vstb having opposite phases to the first and second storage electrode lines SLa and SLb, respectively.

Each of the elements 400, 500, 600, 700 and 800 mentioned above may be directly mounted on the LC panel assembly 300 in the form of at least one integrated circuit (IC) chip. The IC chip may be mounted on a flexible printed circuit film (not shown) in a tape carrier package (TCP) type which is attached to the LC panel assembly 300, or the IC chip may be mounted on a separate printed circuit board (not shown). On the other hand, the elements 400, 500, 600, and 800 may be integrated into the LC panel assembly 300 along with the 27, signal lines $G_1$-$G_n$, $D_1$-$D_m$, SLa, and SLb, and the TFT switching elements Q. Also, the elements 400, 500, 600, and 800 may be integrated into a single chip, and in this case, at least one thereof or at least one circuit element forming these may be located outside of the single chip.

Now, the operation of the LCD will be described in further detail.

The signal controller 600 is supplied with input image signals R, G, and B and input control signals for controlling the display thereof from an external graphics controller (not shown). The input control signals include, for example, a vertical synchronization signal Vsync, a horizontal synchronization signal Hsync, a main clock signal MCLK, and a data enable signal DE.

On the basis of the input control signals and the input image signals P, G, and B, the signal controller 600 processes the input image signals R, G, and B for operating the LC panel assembly 300 and generates gate control signals CONT1, data control signals CONT2, and storage electrode control signals CONT3.

Then, the signal controller 600 transmits the gate control signals CONT1 to the gate driver 400, the processed image signals DAT and the data control signals CONT2 to the data driver 500, and the storage electrode control signals CONT3 to the storage electrode driver 700.

The gate control signals CONT1 include a scanning start signal STV for instructing scanning to start and at least one clock signal for controlling the output time of the gate-on voltage Von. The gate control signals CONT1 may further include an output enable signal OE for defining the duration of the gate-on voltage Von.

The data control signals CONT2 include a horizontal synchronization start signal STH for indicating a start of image data transmission for a row of pixels PX, a load signal LOAD for instructing the data voltages to be applied to the data lines $D_1$-$D_m$, and a data clock signal HCLK. The data control signal CONT2 may further include an inversion signal RVS for reversing the polarity of the data signals with respect to the common voltage Vcom.

The storage electrode driver 700 applies the first and second storage electrode signals Vsta and Vstb to the first and second storage electrode lines SLa and SLb respectively according to the storage electrode control signals CONT3 from the signal controller 600. The first and second storage electrode signals Vsta and Vstb reverse periodically with respect to the common voltage Vcom and their phases are opposite to each other.

Responding to the data control signals CONT2 from the signal controller 600, the data driver 500 sequentially receives the digital image signals DAT for a row of pixels PX, selects gray voltages corresponding to respective digital image signals DA, converts the digital image signals DAT into analog data signals, and applies the analog data signals to corresponding data lines $D_1$-$D_m$.

The gate driver 400 applies the gate-on voltage Von to the gate lines $G_1$-$G_n$ in response to the gate control signals CONT1 from the signal controller 600, thereby turning on the switching elements Q connected to the gate lines $G_1$-$G_n$. Then, the data signals applied to the data lines $D_1$-$D_m$ are applied to corresponding pixels PX through the turned-on switching elements Q.

The difference between the voltage of the data signal applied to a first sub-pixel electrode 191a and the common voltage Vcom appears as a charge voltage of the first LC capacitor Clc1, in other words, a first sub-pixel electrode voltage. Also, the difference between the voltage of the data signal applied to a second sub-pixel electrode 191b and the common voltage Vcom appears as a charge voltage of the second LC capacitor Clc2, in other words, a second sub-pixel electrode voltage.

When the switching element Q is turned off, the first and second sub-pixel electrodes 191a and 191b are in a floating state. However, since the first and second sub-pixel electrodes 191a and 191b form capacitors Csta and Cstb along with the first and second storage electrode lines 131a and 131b, respectively, the voltages of the first and second sub-pixel electrodes 191a and 191b vary according to a voltage change of the first and second storage electrode lines 131a and 131b. The average voltage of the second sub-pixel electrode 191b with respect to the common voltage Vcom may be higher than the average voltage of the first sub-pixel electrode 191a with respect to the common voltage Vcom by adjusting the polarities of the first and second storage electrode signals Vsta and Vstb.

Now, another example of the LC panel assembly of FIG. 21 will be described in detail with reference to FIG. 24 to FIG. 27.

Figure 24:
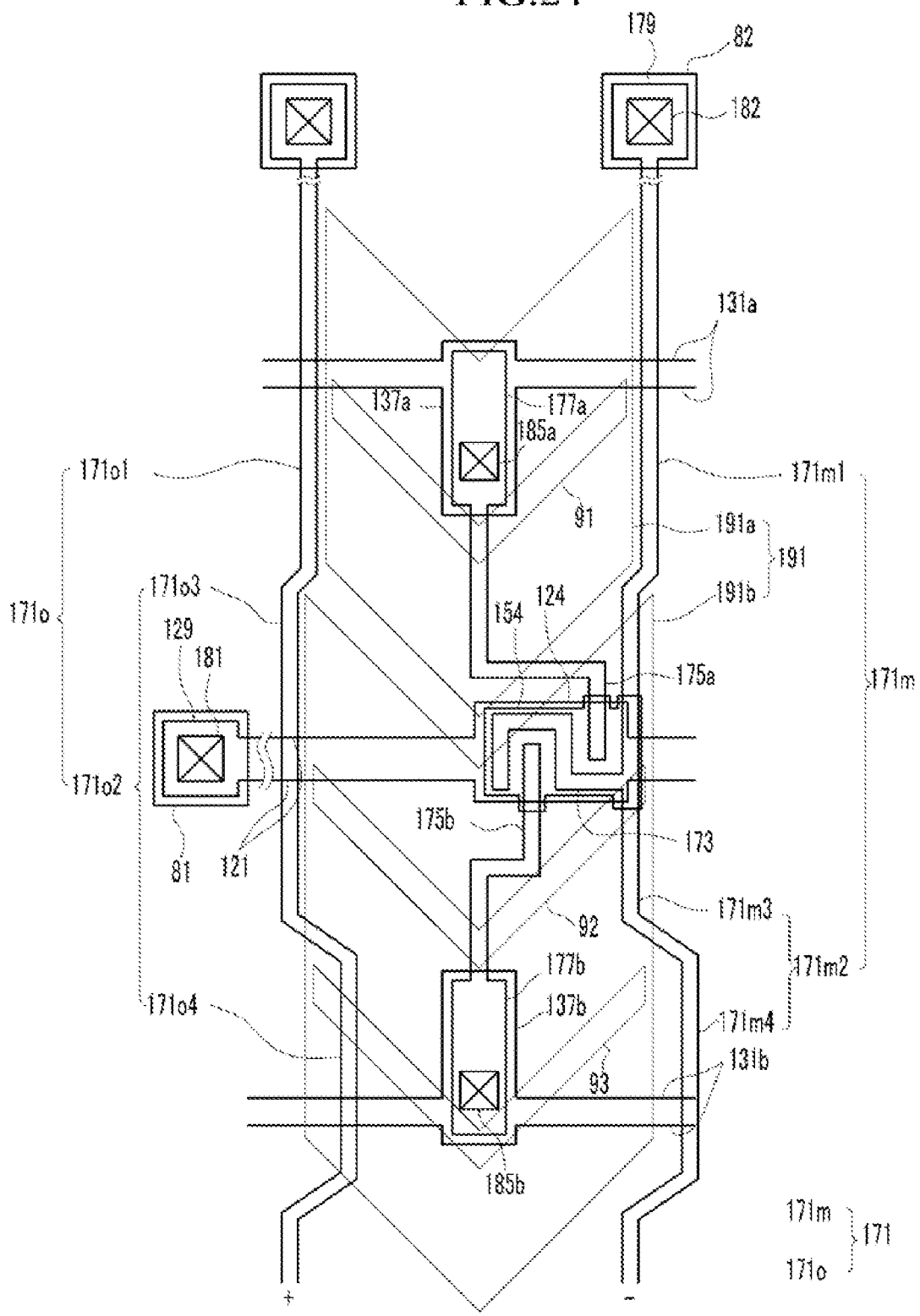
FIG. 24 is a layout view of an LC panel assembly according to an exemplary embodiment of the present invention.
Figure 25:
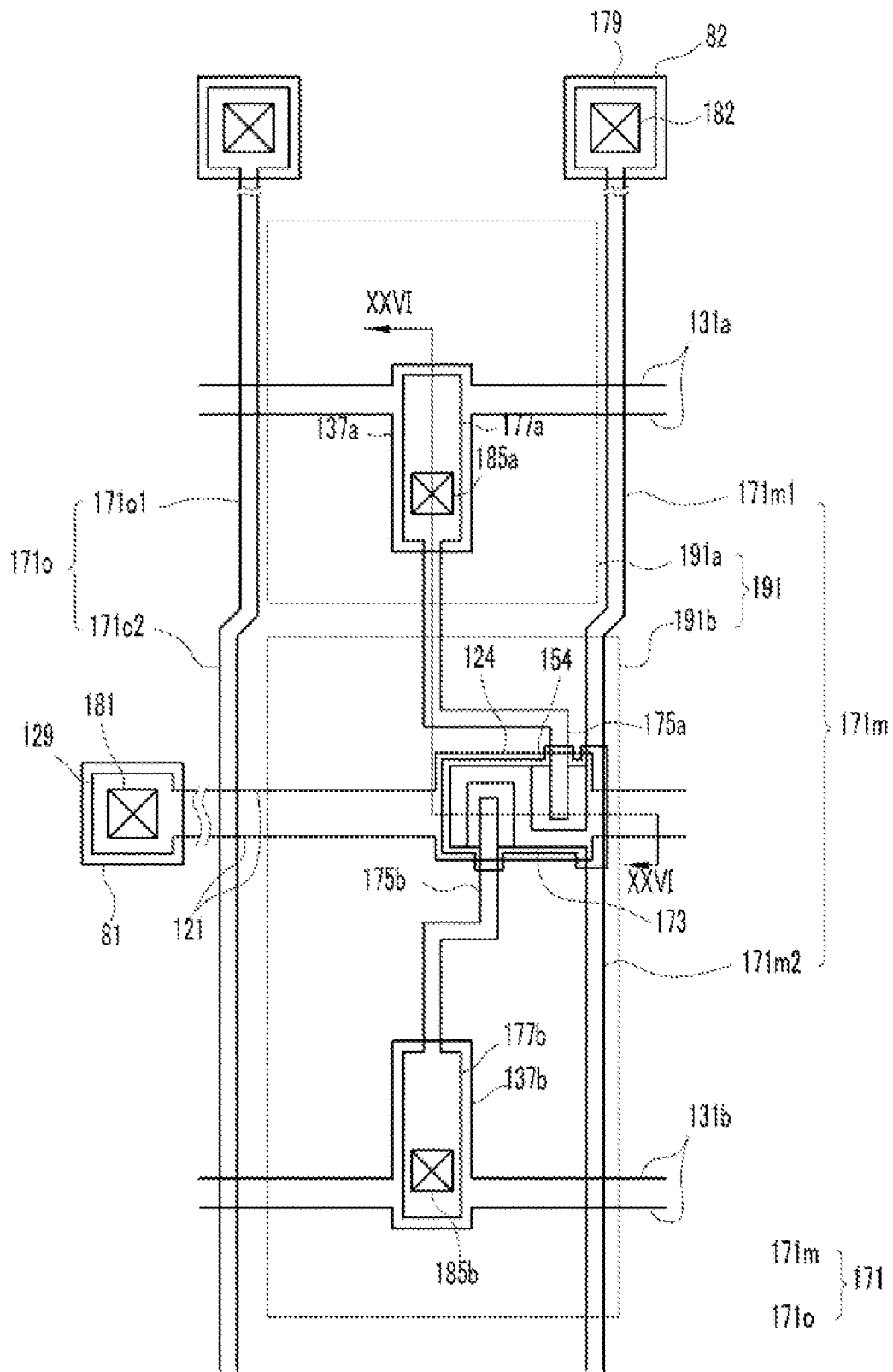
FIG. 25 is a layout view of an LC panel assembly according to an exemplary embodiment of the present invention.
Figure 26:
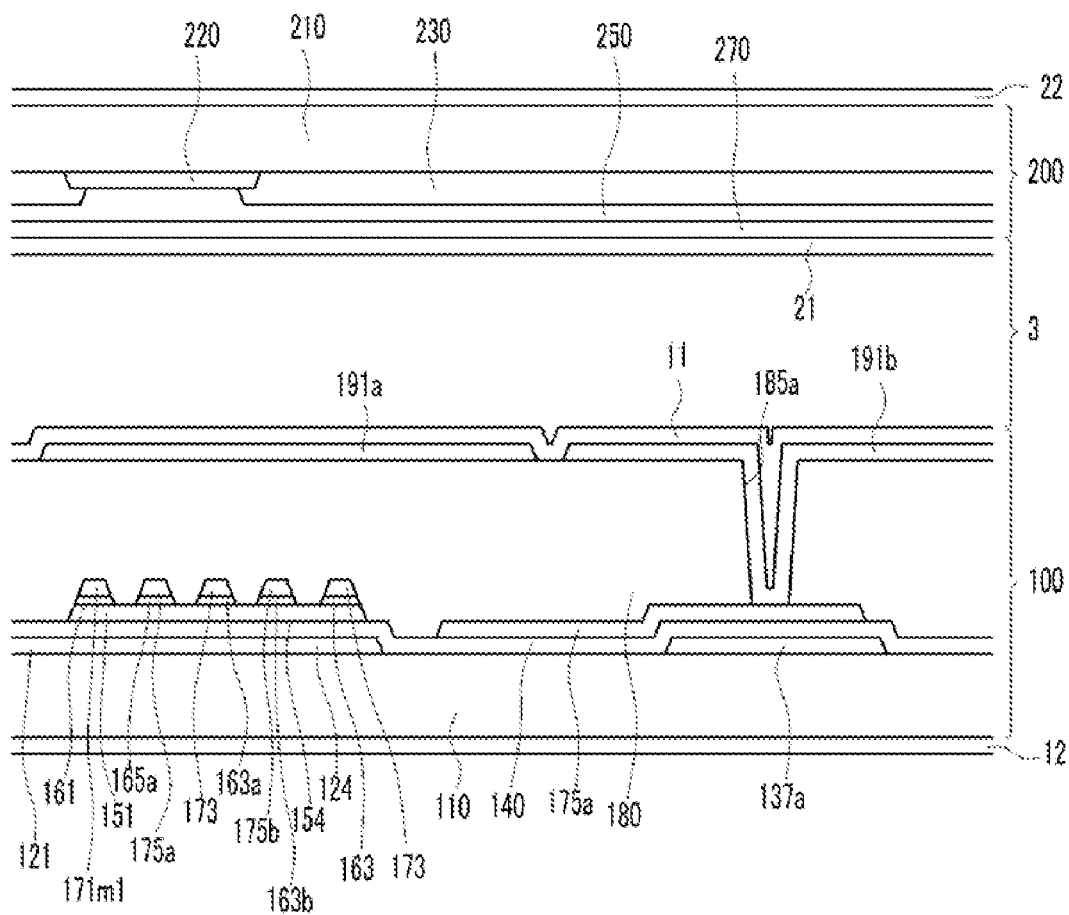
FIG. 26 is a cross-sectional view of the LC panel assembly illustrated in FIG. 25 taken along line XXVI-XXVI.
Figure 27:
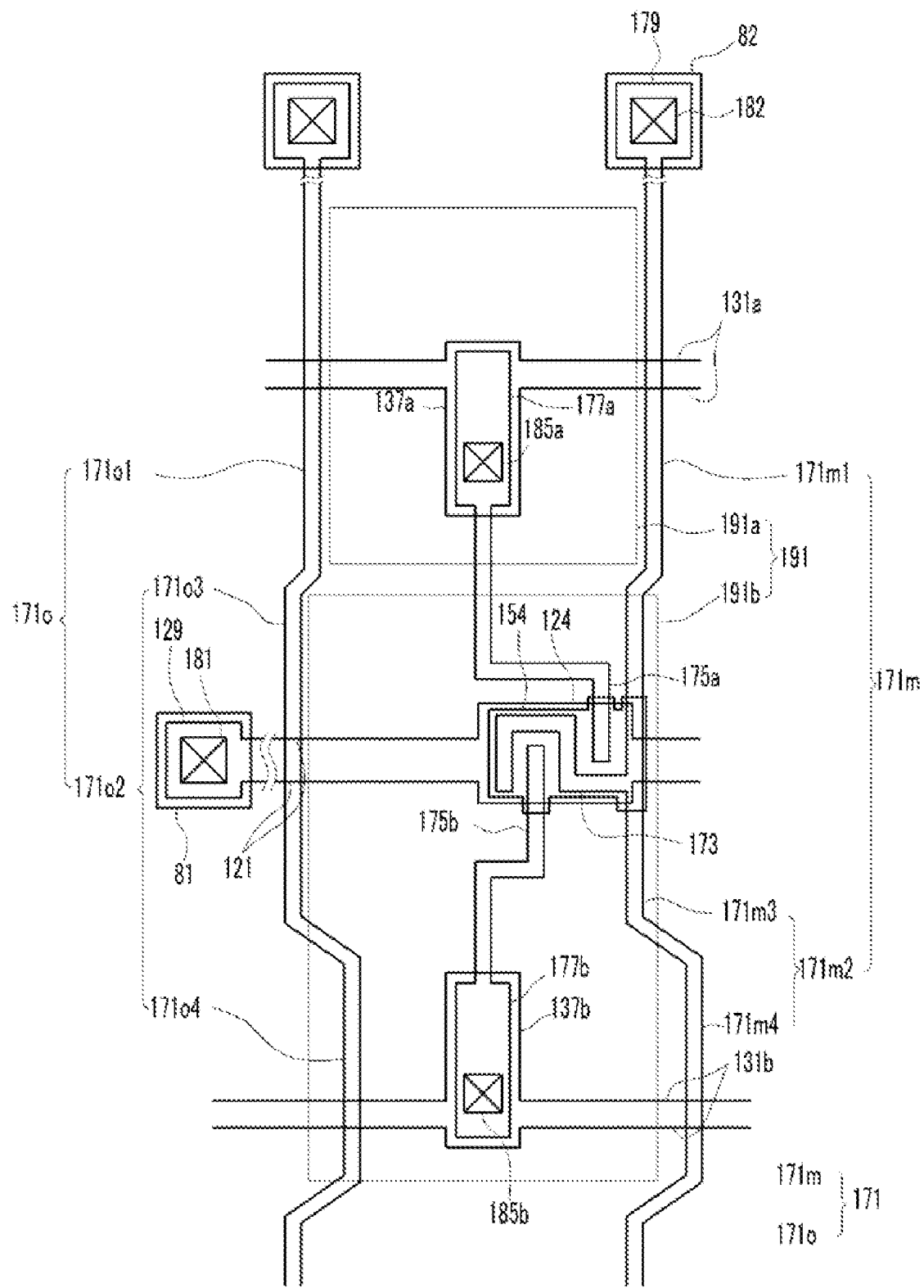
FIG. 27 is a layout view of an LC panel assembly according to an exemplary embodiment of the present invention.

FIG. 24, FIG. 25, and FIG. 27 are layout views illustrating an LC panel assembly according to various exemplary embodiments of the present invention, and FIG. 26 is a cross-sectional view of the LC panel assembly illustrated in FIG. 25 taken along line XXVI-XXVI.

Referring to FIG. 24, FIG. 25, FIG. 26, and FIG. 27, the LC panel assembly includes a lower panel 100 and an upper panel 200 opposing each other and an LC layer 3 interposed between the two panels 100 and 200.

The layered structure of the LC panel assembly according to the present exemplary embodiments is similar to the layered structure of the LC panel assembly illustrated in FIG. 4 to FIG. 6.

Regarding the lower panel 100, a plurality of gate conductors including a plurality of gate lines 121 and a plurality of pairs of storage electrode lines 131a and 131b are formed on an insulating substrate 110. Each gate line 121 includes gate electrodes 124 and an end portion 129. A gate insulating layer 140 is formed on the gate conductors 121, 131a and 131b. A plurality of semiconductors 154 are formed on the gate insulating layer 140, and a plurality of ohmic contacts 163a and 165a are formed thereon. Data conductors including a plurality of data lines 171 and a plurality of first and second drain electrodes 175a and 175b are formed on the ohmic contacts 163a and 165a. Each data line 171 includes a plurality of source electrodes 173 and an end portion 179, and the drain electrodes 175a and 175b respectively include end portions 177a and 177b having a large area. A passivation layer 180 is formed on the data conductors 171, 175a, and 175b and exposed portions of the semiconductors 154, and the passivation layer 180 and the gate insulating layer 140 have a plurality of contact holes 181, 182, 185a, and 185b. A plurality of pixel electrodes 191 including first and second sub-pixel electrodes 191a and 191b and a plurality of contact assistants 81 and 82 are formed on the passivation layer 180. An alignment layer 11 is formed on the pixel electrodes 191, the contact assistants 81 and 82, and the passivation layer 180.

Regarding the upper panel 200, a light blocking member 220, color filters 230, a common electrode 270, and an alignment layer 21 are formed on an insulating substrate 210.

However, in the LC panel assembly illustrated in FIG. 24, unlike the LC panel assembly of FIG. 23, the shape of the data lines 171 is the same as that of the data lines 171 of the LC panel assembly illustrated in FIG. 18.

In the LC panel assembly illustrated in FIG. 25 and FIG. 26, unlike the LC panel assembly of FIG. 23, the semiconductors 154 are extended along the data lines 171 and the drain electrodes 175a and 175b to form semiconductor stripes 151, and the ohmic contacts 163, 165a, and 165b are extended along the data lines 171 to form ohmic contact stripes 161. The semiconductor stripes 151 have substantially the same planar shapes as the data lines 171 and the drain electrodes 175a and 175b as well as the underlying ohmic contacts 163, 165a, and 165b.

In a manufacturing method of the LC panel assembly according to an exemplary embodiment of the present invention, the data lines 171, the drain electrodes 175a and 175b, the semiconductor stripes 151, and the ohmic contacts 163, 165a, and 165b are formed simultaneously using a photolithography process.

The photosensitive film used in the photolithography process has position-dependent thickness, and particularly, it includes first and second portions having thicknesses decreasing in sequence. The first portions of the photosensitive film are located on wiring regions occupied by the data lines 171 and the drain electrodes 175a and 175b, and the second portions are located on the channel regions of the TFTs.

The position-dependent thickness of the sensitive film is obtained by several techniques, for example, by providing translucent areas on an exposure mask as well as light transmitting areas and light blocking areas. The translucent areas may have a slit pattern, a lattice pattern, or a thin film(s) with intermediate transmittance or intermediate thickness. When using a slit pattern, it is preferable that the width of the slits or the distance between the slits is smaller than the resolution of a light exposer used for the photolithography process. Another example is to use a reflowable photosensitive film. In detail, after a photosensitive film pattern made of a reflowable material is formed by using a normal exposure mask with only light transmitting areas and light blocking areas, it is subjected to a reflow process to flow onto areas without the photosensitive film, thereby forming thin portions.

In this way, the manufacturing method is simplified because one photolithography process is omitted.

In the LC panel assembly of FIG. 27, unlike the LC panel assembly of FIG. 23, the shape of the pixel electrodes 191 and the shape of the data lines 171 are the same as those of the LC panel assembly of FIG. 20.

Numerous characteristics of the LC panel assembly illustrated in FIG. 4 to FIG. 6 may also be applied to the LC panel assembly illustrated in FIG. 24 to FIG. 27.

As described above, according to exemplary embodiments of the present invention, data lines partially overlap pixel electrodes, thereby preventing occurrence of vertical crosstalk by minimizing parasitic capacitances generated between the data lines and the pixel electrodes as well as ensuring a sufficient aperture ratio. Therefore the display quality of display devices can be improved.

While the present invention has been described in detail with reference to the exemplary embodiments, those skilled in the art will appreciate that various modifications and substitutions can be made thereto without departing from the spirit and scope of the present invention as set forth in the appended claims.

What is claimed is:

1. A liquid crystal display comprising:
   a substrate;
   at least one pixel electrode formed on the substrate, the pixel electrode including a first and a second sub-pixel electrode; and
   a first data line formed on the substrate,
   wherein the first data line does not overlap with the first sub-pixel electrode and overlaps with the second sub-pixel electrode, and
   wherein the first sub-pixel electrode is structurally separated from the second subpixel electrode.

2. The liquid crystal display of claim 1, wherein the first data line includes a first portion not overlapping the first sub-pixel electrode and a second portion overlapping the second sub-pixel electrode, and the first and the second portions are curved to each other.

3. The liquid crystal display of claim 2, wherein a distance between the first portion and a transverse center-line of the pixel electrode is greater than a distance between the second portion and a transverse center-line of the pixel electrode.

4. The liquid crystal display of claim 2, wherein the second portion of the first data line includes a third portion overlapping the second sub-pixel electrode and a fourth portion not overlapping the second sub-pixel electrode.

5. The liquid crystal display of claim 4, wherein the third and fourth portions of the first data line are curved to each other.

6. The liquid crystal display of claim 5, wherein a distance between the fourth portion and a transverse center-line of the pixel electrode is greater than a distance between the third portion and a transverse center-line of the pixel electrode.

7. The liquid crystal display of claim 1, wherein the first data line is connected to the first sub-pixel electrode.

8. The liquid crystal display of claim 1, further comprising an organic layer formed between the first data lines and the pixel electrodes.

9. The liquid crystal display of claim 1, further comprising a second data line that is adjacent to the first data line.

10. The liquid crystal display of claim 9, wherein the second data line is disposed apart from the pixel electrode.

11. The liquid crystal display of claim 10, wherein the second data line does not overlap the pixel electrode.

12. The liquid crystal display of claim 10, wherein the second data line includes a first portion adjacent to the first sub-pixel electrode and a second portion adjacent to the second sub-pixel electrode, and wherein at least a part of the second portion of the second data line overlaps the second sub-pixel electrode.

13. The liquid crystal display of claim 12, wherein a distance between the first portion and a transverse center-line of the pixel electrode is greater than a distance between the second portion and a transverse center-line of the pixel electrode.

14. The liquid crystal display of claim 12, wherein the second portion of the second data line includes a third portion overlapping the second sub-pixel electrode and a fourth portion not overlapping the second sub-pixel electrode.

15. The liquid crystal display of claim 9, further comprising an organic layer formed between the second data line and the pixel electrode.

16. The liquid crystal display of claim 1, wherein the first and the second sub-pixel electrode include at least one parallelogrammic electrode piece, the parallelogrammic electrode piece having lengthwise edges and oblique edges that are adjacent to the lengthwise edges.

17. The liquid crystal display of claim 16, wherein at least one lengthwise edge of the parallelogrammic electrode pieces of the first and second sub-pixel electrodes adjoin each other.

18. The liquid crystal display of claim 17, wherein at least one oblique edge of each of the parallelogrammic electrode pieces of the first and second sub-pixel electrodes meet each other at right angles.

19. The liquid crystal display of claim 18, further comprising a tilt direction determining member formed at the first and the second sub-pixel electrodes.

20. The liquid crystal display of claim 19, wherein the tilt direction determining member includes a plurality of cutouts that have oblique edges which are substantially parallel to the oblique edges of the parallelogrammic electrode pieces.

21. The liquid crystal display of claim 16, wherein a height of the first subpixel electrode is different from a height of the second sub-pixel electrode.

22. The liquid crystal display of claim 21, wherein the height of the second sub-pixel electrode is more than the height of the first sub-pixel electrode.

23. The liquid crystal display of claim 16, wherein a width of the first subpixel electrode is different from a width of the second sub-pixel electrode.

24. The liquid crystal display of claim 23, wherein the width of the second sub-pixel electrode is longer than the width of the first sub-pixel electrode.

25. The liquid crystal display of claim 16, wherein the first sub-pixel electrode and the second sub-pixel electrode are adjacent to each other.

26. The liquid crystal display of claim 25, wherein a transverse center-line of the first sub-pixel electrode and a transverse center-line of the second sub-pixel electrode are aligned with each other.

27. The liquid crystal display of claim 1, wherein the first and second sub-pixel electrodes include a first and a second edge that are substantially parallel to the first data line and a third and a fourth edge that are perpendicular to the first and second edges.

28. The liquid crystal display of claim 27, wherein the first and second electrode have a substantially quadrangular shape.

29. The liquid crystal display of claim 27, wherein a height of the first subpixel electrode is different from a height of the second sub-pixel electrode.

30. The liquid crystal display of claim 29, wherein the height of the second sub-pixel electrode is higher than the height of the first sub-pixel electrode.

31. The liquid crystal display of claim 24, wherein a width of the first subpixel electrode is different from a width of the second sub-pixel electrode.

32. The liquid crystal display of claim 24, wherein the width of the second sub-pixel electrode is longer than the width of the first sub-pixel electrode.

33. The liquid crystal display of claim 27, wherein the first sub-pixel electrode and the second sub-pixel electrode are adjacent to each other.

34. The liquid crystal display of claim 33, wherein a transverse center-line of the first sub-pixel electrode and a transverse center-line of the second sub-pixel electrode are aligned with each other.

35. The liquid crystal display of claim 1, wherein a voltage of the first subpixel electrode and a voltage of the second sub-pixel electrode are different.

36. The liquid crystal display of claim 35, wherein an area of the first subpixel electrode is smaller than an area of the second sub-pixel electrode, and a voltage of the first sub-pixel electrode is higher than a voltage of the second sub-pixel electrode.

37. The liquid crystal display of claim 36, further comprising:
a first thin film transistor connected to the first sub-pixel electrode and a second thin film transistor connected to the second sub-pixel electrode; and
a gate line connected to the first and second thin film transistors.

38. The liquid crystal display of claim 37, further comprising a first storage electrode line and a second storage electrode line that are parallel to the gate line.

39. The liquid crystal display of claim 38, wherein the first thin film transistor includes a first drain electrode overlapping the first storage electrode line and the second thin firm transistor includes a second drain electrode overlapping the second storage electrode line.

40. The liquid crystal display of claim 37, further comprising:
a first thin film transistor connected to the first sub-pixel electrode;
a second thin film transistor connected to the second sub-pixel electrode;
a first gate line connected to the first thin film transistor; and
a second gate line connected to the second thin film transistor.

41. The liquid crystal display of claim 40, wherein the first and second thin film transistors are respectively turned on in response to signals from the first and second gate lines, and transmit signals from the first data line.

42. The liquid crystal display of claim 40, further comprising:
a first thin film transistor connected to the first sub-pixel electrode and the first data line;
a second thin film transistor connected to the second sub-pixel electrode; a second data line connected to the second thin film transistor; and
a gate line connected to the first and second thin film transistors, the gate line intersecting the first and second data lines.

43. The liquid crystal display of claim 42, wherein the first and second thin film transistors are turned on in response to signals from the gate line, and respectively transmit signals from the first and second data lines.

44. The liquid crystal display of claim 42, further comprising a first storage electrode line and a second storage electrode line that are parallel to the gate line.

45. The liquid crystal display of claim 44, wherein the first thin film transistor includes a first drain electrode overlapping the first storage electrode line, and the second thin film transistor includes a second drain electrode overlapping the second storage electrode line.

46. The liquid crystal display of claim 14, wherein the third and fourth portions of the second data line are curved to each other.

47. The liquid crystal display of claim 46, wherein a distance between the fourth portion and a transverse center-line of the pixel electrode is greater than the third portion and a transverse center-line of the pixel electrode.

48. The liquid crystal display of claim 1, further comprising an auxiliary electrode, wherein the first data line extends along a gap between the auxiliary electrode and the first sub-pixel electrode.

49. The liquid crystal display of claim 48, wherein the auxiliary electrode is connected to the first sub-pixel through a connecting portion.

50. The liquid crystal display of claim 49, wherein the first sub-pixel electrode and the first data line do not overlap except for the connecting portion.

51. The liquid crystal display of claim 48, further comprising a second data line that is adjacent to the first data line.

52. The liquid crystal display of claim 51, wherein the second data line is disposed apart from the pixel electrode.

53. The liquid crystal display of claim 52, wherein the auxiliary electrodes are formed on both sides of the first sub-pixel electrode.

54. The liquid crystal display of claim 53, wherein the first sub-pixel electrode and the first data line and the second data line do not overlap except for the connecting portion.

* * * * *